(12) United States Patent
Kim et al.

(10) Patent No.: US 12,309,446 B2
(45) Date of Patent: May 20, 2025

(54) DISPLAY APPARATUS AND METHOD OF CONTROLLING THE SAME

(71) Applicant: SAMSUNG ELECTRONICS CO., LTD., Suwon-si (KR)

(72) Inventors: Kyungwoo Kim, Suwon-si (KR); Duhe Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 86 days.

(21) Appl. No.: 18/103,899

(22) Filed: Jan. 31, 2023

(65) Prior Publication Data

US 2023/0179824 A1 Jun. 8, 2023

Related U.S. Application Data

(63) Continuation of application No. PCT/KR2021/009970, filed on Jul. 30, 2021.

(30) Foreign Application Priority Data

Aug. 7, 2020 (KR) .......................... 10-2020-0099484

(51) Int. Cl.
*H04N 21/43* (2011.01)
*H04N 5/265* (2006.01)
(Continued)

(52) U.S. Cl.
CPC ....... *H04N 21/43074* (2020.08); *H04N 5/265* (2013.01); *H04N 21/4316* (2013.01);
(Continued)

(58) Field of Classification Search
None
See application file for complete search history.

(56) References Cited

U.S. PATENT DOCUMENTS 6,072,832 A 6/2000 Katto
7,453,522 B2 11/2008 Kobayashi
(Continued)

FOREIGN PATENT DOCUMENTS

CN 1993978 A 7/2007
CN 103168474 A 6/2013
(Continued)

OTHER PUBLICATIONS

International Search Report for PCT/KR2021/009970 mailed Nov. 12, 2021, 5 pages.
(Continued)

*Primary Examiner* — Michael J Cobb
(74) *Attorney, Agent, or Firm* — Nixon & Vanderhye P.C.

(57) ABSTRACT

A display apparatus may include: a display; a video processor configured to process a video signal; a graphic processor configured to process a graphic signal; a mixer configured to mix a video corresponding to the video signal processed by the video processor and a graphic corresponding to the graphic signal processed by the graphic processor to be displayed together on the display; and a main processor configured to identify a video frame and a graphic frame, to which matching identification information is assigned, based on identification information assigned to a plurality of video frames of the video signal and identification information assigned to a plurality of graphic frames of the graphic signal in order of the respective frames, and control the video processor and/or the graphic processor to delay and output at least one of the identified video frame and the identified graphic frame to make the video of the identified video frame and the graphic of the identified graphic frame be displayed together on the display.

17 Claims, 14 Drawing Sheets

(51) Int. Cl.
*H04N 21/431* (2011.01)
*H04N 21/435* (2011.01)
*H04N 21/44* (2011.01)
*H04N 21/4402* (2011.01)
*H04N 21/81* (2011.01)

(52) U.S. Cl.
CPC ..... *H04N 21/435* (2013.01); *H04N 21/44004* (2013.01); *H04N 21/440281* (2013.01); *H04N 21/8146* (2013.01)

(56) References Cited

U.S. PATENT DOCUMENTS

| | | |
|---|---|---|
| 10,021,458 B1 | 7/2018 | Taylor et al. |
| 2006/0017853 A1 | 1/2006 | Chang et al. |
| 2010/0188580 A1 | 7/2010 | Paschalakis et al. |
| 2011/0188580 A1* | 8/2011 | Valmiki ............... H04N 19/436 375/240.24 |
| 2012/0092443 A1 | 4/2012 | Mauchly |
| 2012/0092450 A1 | 4/2012 | Choi et al. |
| 2012/0105448 A1 | 5/2012 | Kim |
| 2012/0140118 A1 | 6/2012 | Tanaka |
| 2014/0125868 A1 | 5/2014 | Madonna et al. |
| 2016/0078664 A1 | 3/2016 | Mizuguchi et al. |
| 2017/0201710 A1 | 7/2017 | Kim |
| 2023/0262191 A1* | 8/2023 | Kim ..................... H04N 5/272 345/634 |

FOREIGN PATENT DOCUMENTS

| | | |
|---|---|---|
| JP | 10-136259 | 5/1998 |
| JP | 2001-186410 | 7/2001 |
| JP | 2004-32012 | 1/2004 |
| JP | 2006-98935 | 4/2006 |
| JP | 2012-74863 | 4/2012 |
| KR | 10-1994-0017784 | 7/1994 |
| KR | 10-2008-0024167 | 3/2008 |
| KR | 10-2008-0047000 | 5/2008 |
| KR | 10-2010-0068726 | 6/2010 |
| KR | 10-2012-0047055 | 5/2012 |
| KR | 10-2017-0083889 | 7/2017 |
| WO | 2007/005327 | 1/2007 |

OTHER PUBLICATIONS

Written Opinion of the ISA for PCT/KR2021/009970 mailed Nov. 12, 2021, 5 pages.
European Extended Search Report dated Dec. 7, 2023 for EP Application No. 21854313.0.
Chinese Office Action dated Jul. 31, 2024 for CN Application No. 202180056918.6.
Korean Office Action dated Sep. 4, 2024 for KR Application No. 10-2020-0099484.
European Examination Report dated Feb. 28, 2025 for EP Application No. 21854313.0.
Chinese Office Action dated Dec. 27, 2024 for CN Application No. 202180056918.6.
Chinese Office Action dated Mar. 20, 2025 for CN Application No. 202180056918.6.

* cited by examiner

FIG. 14

| Time | T1 | T2 | T3 | T4 | T5 | T6 | ••• |
|------|----|----|----|----|----|----|-----|
| V    | 1  | 2  | 3  | 4  | 5  | 6  | ••• |
| G    |    |    | 1  | 2  | 3  | 4  | ••• |

1301, 1302

DISPLAY APPARATUS AND METHOD OF CONTROLLING THE SAME

CROSS-REFERENCE TO RELATED APPLICATIONS

This application is a continuation of International Application No. PCT/KR2021/009970 designating the United States, filed on Jul. 30, 2021, in the Korean Intellectual Property Receiving Office and claiming priority to Korean Patent Application No. 10-2020-0099484 filed on Aug. 7, 2020, in the Korean Intellectual Property Office, the disclosures of which are incorporated by reference herein in their entireties.

BACKGROUND

Field

Certain example embodiments to a display apparatus and/or a method of controlling the same, and for example to a display apparatus, which can process an image and a graphic to be displayed together, and/or a method of controlling the same.

DESCRIPTION OF RELATED ART

An electronic apparatus with a display, such as a television (TV), receives various pieces of content from an external source, and displays an image based on the content on the display.

With the recent popularization of various video services using a network environment, broadcasting services or video services that provide content including appended images such as graphics are also gradually increasing.

The TV or the like electronic apparatus may include separate processors for processing a video signal and a graphic signal, respectively, to improve image quality and display an image based on the mixture of the two processed signals.

In the electronic apparatus including such separate processors, when one of two signals processed through different paths, for example, a video signal, is delayed, the video and the graphic may be mixed without matching each other or a boundary between a video and a graphic may be distorted, so that an image cannot be normally displayed on a screen, thereby making it inconvenient for a user to view the image.

SUMMARY

Certain example embodiments provide a display apparatus and/or a method of controlling the same, in which a video signal and a graphic signal output through separate processors are controlled to be synchronized, thereby preventing or reducing inconvenience in viewing due to a mismatch or a distortion.

According to an example embodiment, there may be provided a display apparatus including: a display; a video processor configured to process a video signal; a graphic processor configured to process a graphic signal; a mixer configured to mix a video corresponding to the video signal processed by the video processor and a graphic corresponding to the graphic signal processed by the graphic processor to be displayed together on the display; and a main processor configured to identify a video frame and a graphic frame, to which matching identification information is assigned, based on identification information assigned to a plurality of video frames of the video signal and identification information assigned to a plurality of graphic frames of the graphic signal in order of the respective frames, and control the video processor and/or the graphic processor to delay and output at least one of the identified video frame and the identified graphic frame to make the video comprising the identified video frame and the graphic of the identified graphic frame be displayed together on the display.

The main processor may control the identified video frame and the identified graphic frame to be synchronized and output by the video processor and the graphic processor at a reference point in time set based on a predetermined sync signal.

The main processor may assign the identification information to the plurality of video frames in sequence, assigns the identification information to the plurality of graphic frames in sequence, and identify the video frame and the graphic frame to which the matching identification information is assigned.

The main processor may control data of the video frames to be sequentially stored in a first queue by assigning the identification information to the plurality of video frames, control data of the graphic frames to be sequentially stored in a second queue by assigning the identification information to the plurality of graphic frames, and control the data of the video frame and the data of the graphic frame, to which the matching identification information is assigned, to be respectively output from the first queue and the second queue at a reference point in time set based on a predetermined sync signal.

The display apparatus may further include a frame rate converter configured to convert a frame rate of the video signal, and the main processor may identify a delay time that occurs during conversion of the frame rate, and control the data of the identified graphic frame between the video frame the graphic frame, to which the matching identification information is assigned, to be output as being more delayed by the identified delay time than the data of the identified video frame.

The display apparatus may further include a frame rate converter configured to convert a frame rate of the video signal; and a memory unit including a buffer configured to store the graphic signal processed by the graphic processor based on a delay time that occurs during conversion of the frame rate.

The video processor may include a video scaler, and the main processor may set geometry information to display the video corresponding to the video signal by executing an application, and may provide the set geometry information to the video scaler.

The graphic processor may include a graphic scaler, and the main processor may render the graphic corresponding to the graphic signal by executing an application, set a pointer to output the rendered graphic, and/or provide information about the set pointer to the graphic scaler.

The display apparatus may further include a memory unit including a first buffer configured to store the video signal processed by the video processor, and a second buffer configured to store the graphic signal processed by the graphic processor, and the main processor may control the video of the video frame of the video signal stored in the first buffer, and the graphic of the graphic frame of the graphic signal stored in the second buffer to be synchronized and output.

The sync signal may include a vertical sync signal for the display.

According to an example embodiment, there may be provided a method of controlling a display apparatus, where the method may include: identifying a video frame and a graphic frame, to which matching identification information is assigned, based on identification information assigned to a plurality of video frames of a video signal and identification information assigned to a plurality of graphic frames of a graphic signal in order of the respective frames; controlling at least one of the identified video frame and the identified graphic frame to be delayed and output to make a video of the identified video frame and a graphic of the identified graphic frame be displayed together on a display; and mixing the video of the output video frame and the graphic of the output graphic frame.

The method may further include controlling the identified video frame and the identified graphic frame to be synchronized and output at a reference point in time set based on a predetermined sync signal.

The method may further include assigning the identification information to the plurality of video frames in sequence, and assigning the identification information to the plurality of graphic frames in sequence.

The method may further include: storing data of the video frames sequentially in a first queue by assigning the identification information to the plurality of video frames; storing data of the graphic frames sequentially in a second queue by assigning the identification information to the plurality of graphic frames; and controlling the data of the video frame and the data of the graphic frame, to which the matching identification information is assigned, to be respectively output from the first queue and the second queue at a reference point in time set based on a predetermined sync signal.

The method may further include: identifying a delay time that occurs during frame rate conversion of a video signal; and controlling the data of the identified graphic frame between the video frame and the graphic frame, to which the matching identification information is assigned, to be output as being more delayed by the identified delay time than the data of the identified video frame.

The method may further include storing a graphic signal in a buffer corresponding to a delay time that occurs during the frame rate conversion of the video signal.

The method may further include setting geometry information to display the video corresponding to the video signal by executing an application, and providing the set geometry information to the video scaler.

The method may further include rendering the graphic corresponding to the graphic signal by executing an application, setting a pointer to output the rendered graphic, and providing information about the set pointer to the graphic scaler.

The display apparatus may further include a first buffer configured to store the video signal processed by the video processor, and a second buffer configured to store the graphic signal processed by the graphic processor, and the method may further include controlling the video of the video frame of the video signal stored in the first buffer, and the graphic of the graphic frame of the graphic signal stored in the second buffer to be synchronized and output.

According to an example embodiment, there may be provided a computer-readable nonvolatile recording medium, in which a program of a method executable by a processor of the display apparatus is recorded, where the method may include: identifying a video frame and a graphic frame, to which matching identification information is assigned, based on identification information assigned to a plurality of video frames of a video signal and identification information assigned to a plurality of graphic frames of a graphic signal in order of the respective frames; and controlling at least one of the identified video frame and the identified graphic frame to be delayed and output to make a video of the identified video frame and a graphic of the identified graphic frame be displayed together on a display; and mixing the video of the output video frame and the graphic of the output graphic frame.

In an example display apparatus and/or a method of controlling the same, a pair of frames corresponding to two images to be displayed together may be controlled to be synchronized and output by an electronic apparatus, so that the two images can be normally matched and displayed without a distortion, thereby reducing a user's visual fatigue and solving the user's inconvenience in viewing.

DESCRIPTION OF DRAWINGS

The above and other aspects, features and advantages of certain embodiments of the present disclosure will be more apparent from the following detailed description, taken in conjunction with the accompanying drawings, in which:

FIG. 14 is a view showing an example of delaying and outputting a graphic signal in the example embodiment of FIG. 12.

DETAILED DESCRIPTION

Figure 1:
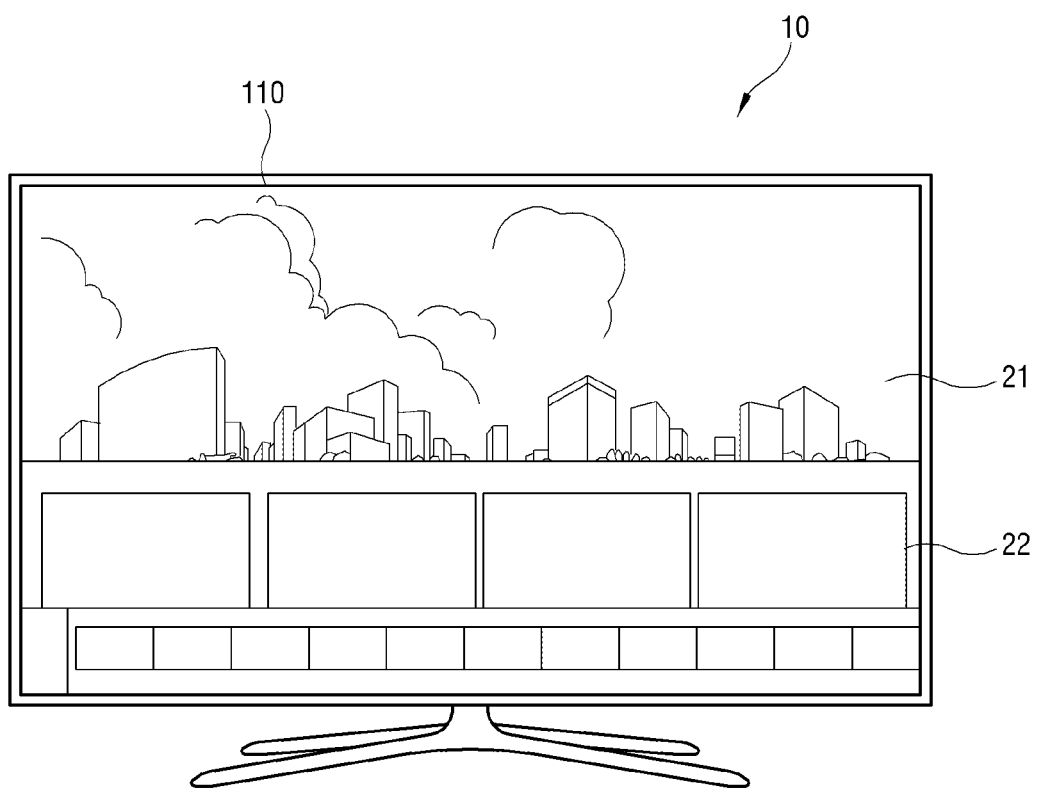
FIG. 1 illustrates an example of an electronic apparatus according to an example embodiment.

Below, exemplary embodiments will be described in detail with reference to accompanying drawings. In the drawings, like numerals or symbols refer to like elements having substantially the same function, and the size of each element may be exaggerated for clarity and convenience of description. However, the configurations and functions illustrated in the following exemplary embodiments are not construed as limiting and the key configurations and functions.

In the following exemplary embodiments, terms 'first', 'second', etc. are only used to distinguish one element from another, and singular forms are intended to include plural forms unless otherwise mentioned contextually. In the following exemplary embodiments, it will be understood that terms 'comprise', 'include', 'have', etc. do not preclude the presence or addition of one or more other features, numbers, steps, operation, elements, components or combination thereof. In addition, a 'module' or a 'portion' may perform at least one function or operation, be achieved by hardware (HW), software (SW) or combination of hardware and software, and be integrated into at least one module. In the disclosure, at least one among a plurality of elements refers to not only all the plurality of elements but also both each one of the plurality of elements excluding the other elements and a combination thereof. Thus, each "module" herein may comprise circuitry.

FIG. 1 illustrates an example of an electronic apparatus according to an example embodiment.

According to an example embodiment, an electronic apparatus 10 may be implemented as a display apparatus including a display 110 as shown in FIG. 1.

The electronic apparatus 10 according to an example embodiment receives a signal from an external signal source, for example, data about content, and processes the received data of content according to preset processes so as to be displayed as an image on the display 110.

According to an embodiment, the electronic apparatus 10 implemented as the display apparatus may include a TV that processes a broadcast image based on at least one among a broadcast signal, broadcast information or broadcast data received from a transmitter of a broadcasting station. In this case, the electronic apparatus 10 may include a tuner to be tuned to a channel corresponding to a broadcast signal.

However, the disclosure is not limited to the implementation example of the electronic apparatus 10. Alternatively, the electronic apparatus 10 may be implemented as an image processing apparatus such as a set-top box that transmits a signal to an external display connected by a wire or wirelessly. Alternatively, the electronic apparatus 10 may be implemented as a terminal apparatus (hereinafter referred to as a user terminal or a user device) with a display, such as a smart phone, a tablet, and a smart pad. Alternatively, the electronic apparatus 10 may be applied to a monitor for a desktop or laptop computer (or a personal computer (PC)).

When the electronic apparatus 10 is a TV, the electronic apparatus 10 may receive broadcast content based n at least one among a broadcast signal, broadcast information or broadcast data from a transmitter of a broadcasting station directly or through an additional apparatus connectable with the electronic apparatus 10 by a cable, for example, through a set-top box (STB), a one-connect box (OC box), a media box, etc. Here, the connection between the electronic apparatus 10 and the additional apparatus is not limited to the cable, but may employ various wired/wireless interfaces.

The electronic apparatus 10 may, for example, wirelessly receive a radio frequency (RF) signal, e.g., broadcast content transmitted from the broadcasting station.

To this end, the electronic apparatus 10 may include an antenna for receiving a broadcast signal.

In the electronic apparatus 10, the broadcast content may be received through a terrestrial wave, a cable, a satellite, etc., and a signal source is not limited to the broadcasting station. In other words, any apparatus or station capable of transmitting and receiving data may be included in the source according to the disclosure.

Figure 2:
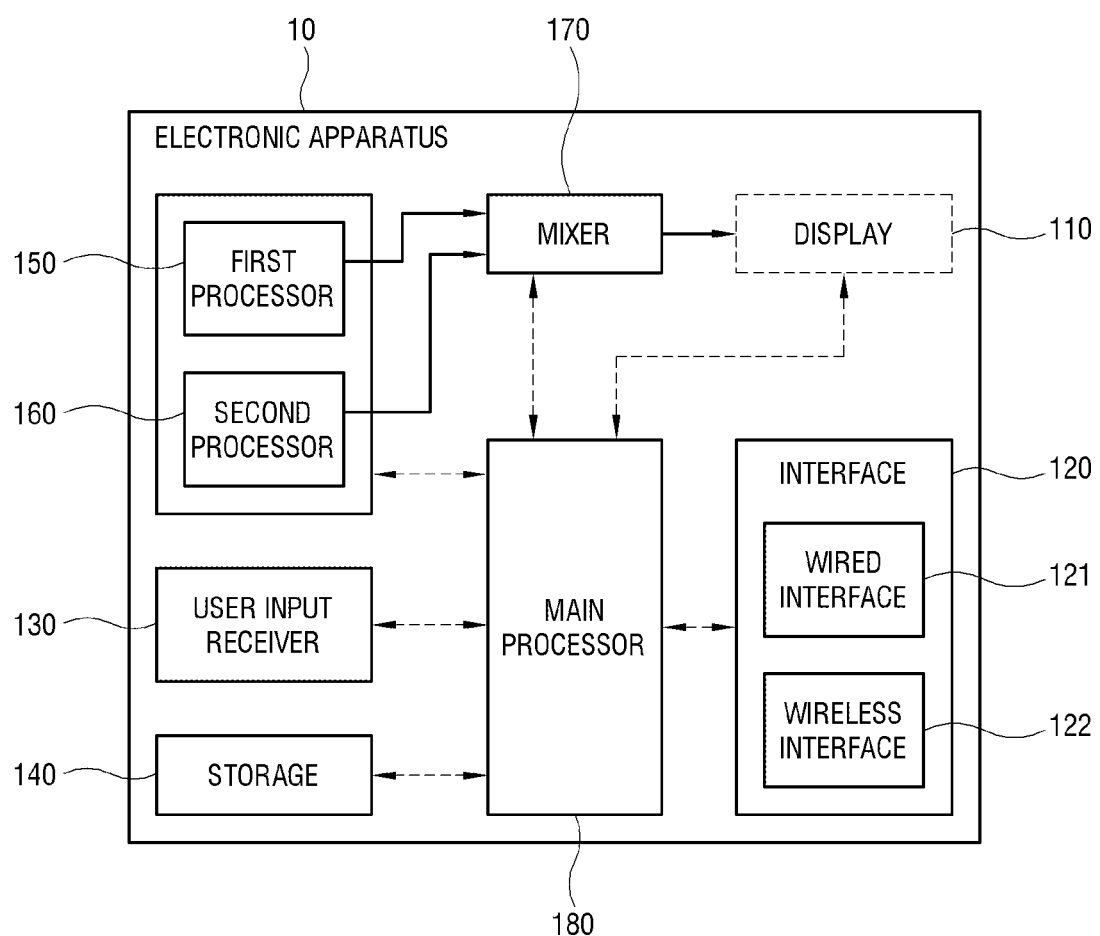
FIG. 2 is a block diagram of an electronic apparatus according to an example embodiment.

Standards of a signal received in the electronic apparatus 10 may be varied depending on the types of the apparatus, and the electronic apparatus 10 may receive a signal as image content based on high definition multimedia interface (HDMI), HDMI-consumer electronics control (CEC), display port (DP), digital visual interface (DVI), composite video, component video, super video, DVI, Thunderbolt, RGB cable, syndicat des constructeurs d'appareils radiorécepteurs et téléviseurs (SCART), universal serial bus (USB), or the like standards by a cable, according to the interface 120 (see FIG. 2).

According to an embodiment, the electronic apparatus 10 may be implemented as a smart TV or an Internet protocol (IP) TV. The smart TV refers to a TV that can receive and display a broadcast signal in real time, have a web browsing function to search and consume various pieces of content through the Internet while displaying the broadcast signal in real time, and provide a convenient user environment for this end. Further, the smart TV can provide an interactive service to a user because it includes an open software platform. Therefore, the smart TV can provide various pieces of content, for example, content of an application for a predetermined service to a user through the open software platform. Such an application refers to an application program for various kinds of services, for example, applications for social network service (SNS), finance, news, weather, map, music, movie, game, electronic book, and the like services.

The electronic apparatus 10 may process a signal to display a moving image, a still image, an application, an on-screen display (OSD), a user interface (UI) for controlling various operations, etc. on a screen based on a signal/data stored in an internal/external storage medium.

The electronic apparatus 10 may use wired or wireless network communication to receive content from various external apparatuses including a server and a terminal apparatus as a source for providing content, but there are no limits to the kinds of communication.

Specifically, the electronic apparatus 10 may use the wireless network communication to receive a signal corresponding to standards of Wi-Fi, Wi-Fi Direct, Bluetooth, Bluetooth low energy, Zigbee, UWB, NFC, etc. as image content corresponding to the type of the interface 120 (to be described later). Further, the electronic apparatus 10 may use Ethernet or the like wired network communication to receive a content signal.

According to an embodiment, the external apparatus may be provided as a content provider, e.g., a content server that can transmit content to various apparatuses such as the electronic apparatus 10 through the wired or wireless network. For example, the external apparatus may provide a media file based on video on demand (VOD) service, web content, etc. by a streaming method in real time.

According to an example embodiment, there may be a plurality of external apparatuses, e.g., servers. In this case, the electronic apparatus 10 may be implemented to connect with each of the plurality of external apparatuses and receive various pieces of content from each connected external apparatus.

The electronic apparatus 10 may, for example, receive media content or video content based on the VOD service from an over-the-top (OTT) server capable of providing an OTT service such as Netflix or a web server such as YouTube.

The electronic apparatus 10 may execute an application for reproducing content, for example, a VOD application to receive content from an external apparatus provided for providing the content, ad process the received content, thereby outputting, e.g., displaying an image corresponding to that content through the display 110. Here, the electronic apparatus 10 may receive the content from the server, e.g., the external apparatus based on a user account corresponding to the executed application.

According to an embodiment, the electronic apparatus 10 may display a first image 21 and a second image 22 together on the display 110 as shown in FIG. 1.

Specifically, the electronic apparatus 10 may receive a first signal (hereinafter referred to as a first image signal) corresponding to the first image 21 and a second image signal (hereinafter referred to as a second image signal) corresponding to the second image 22, and process each of the first signal and the second signal. The electronic apparatus 10 may mix the first signal and the second signal, which are processed through separate paths as described above, so that the two images 21 and 22 can be displayed together on the display 110.

Here, the first signal may correspond to a video signal, and the second signal may correspond to a graphic signal.

The graphic signal may for example a signal for displaying a subpicture, a subtitle, a teletext, an on screen display (OSD) or user interface (hereinafter referred to as a graphic user interface (GUI)) displayed for giving information (e.g., a channel number, a program title, etc.) to a user or controlling various operations, but is not limited thereto.

The graphic signal may be included in content provided from a server or the like external apparatus, or may be provided from the external apparatus as a separate signal separated from the content. Here, the external apparatus providing the content may be different from or the same as the external apparatus providing the graphic signal.

Further, the graphic signal may have been embedded in the electronic apparatus 10 or an additional device such as a set-top box.

According to an embodiment, the graphic signal may have a plurality of layers.

According to an embodiment, the electronic apparatus 10 may display an interactive graphic (IG) or presentation graphic (PG) generated by processing the graphic signal on the display 110 as the second image.

According to an embodiment, the second image based on the graphic signal, e.g., the graphic, may be displayed on the display 110 while being overlaid on the first image based on the video signal, or may be displayed in a separate area separated from an area where the first image based on the video signal.

Below, the configurations of the electronic apparatus according to an example embodiment will be described with reference to the accompanying drawings.

FIG. 2 is a block diagram of an electronic apparatus according to an example embodiment.

However, FIG. 2 merely shows the exemplary elements of the electronic apparatus 10 according to an example embodiment, and the first electronic apparatus according to an alternative embodiment may include elements different from those of FIG. 2. In other words, the electronic apparatus 10 may include another element besides the elements shown in FIG. 2, or may exclude at least one element from the elements shown in FIG. 2. Further, the electronic apparatus 10 may be implemented by changing some elements of those shown in FIG. 2.

The electronic apparatus 10 according to an example embodiment may, as shown in FIG. 2, include the display 110.

The display 110 may display an image.

The display 110 may be, but not limited to, for example implemented by various display types such as liquid crystal, plasma, light-emitting diode, organic light-emitting diode, surface-conduction electron-emitter, carbon nano-tube, nano-crystal, etc. According to an embodiment, the display 110 may include a panel for displaying an image thereon, and further include additional elements, for example, a driver according to its types.

According to an embodiment, the display 110 may display an image of content received from the source, e.g., the external apparatus such as the server.

According to an embodiment, the display 110 may display the first image based on the first signal and the second image based on the second signal together on the display 110.

According to an embodiment, the second image may be displayed on the display 110 while being overlaid on the first image, or may be displayed on a separate area separated from an area where the first image is displayed.

The electronic apparatus 10 may include the interface 120.

The interface 120 allows the electronic apparatus 10 to communicate with various external apparatuses such as the server.

The interface 120 may include a wired interface 121. The wired interface 121 may include a connector for transmitting/receiving a signal/data based on the standards such as HDMI, HDMI-CEC, USB, Component, DP, DVI, Thunderbolt, RGB cables, etc. Here, the wired interface 121 may include at least one connector, terminal or port respectively corresponding to such standards.

The wired interface 121 is embodied to include an input port to receive a signal from the source or the like, and further include an output port as necessary to interactively transmit and receive a signal.

The wired interface 121 may include a connector, port, etc. based on video and/or audio transmission standards, such as an HDMI port, a DisplayPort, a DVI port, Thunderbolt, composite video, component video, super video, and SCART, so as to connect with an antenna for receiving a broadcast signal based on broadcast standards such as terrestrial/satellite broadcasts, or a cable for receiving a broadcast signal based on cable broadcast standards. Alternatively, the electronic apparatus 10 may include a built-in antenna for receiving a broadcast signal.

when a video/audio signal received through the interface 120 is a broadcast signal, the electronic apparatus 10 may further include a tuner to be tuned to the channels corresponding to the received broadcast signals. The tuner may include a demodulator that demodulates a broadcast signal of a certain tuned channel and outputs a signal in the form of a transport stream (TS). In other words, the tuner and the demodulator may be designed as a single integrated chip, or may be respectively designed as separated two chips.

The wired interface 121 may include a connector or port based on universal data transmission standards, such as a USB port. The wired interface 121 may include a connector or port to which an optical cable based on optical transmission standards is connectable. The wired interface 121 may include a connector or port to which an external microphone or an external audio device with a microphone is connected for the reception or input of an audio signal from the microphone or audio device. The wired interface 121 may include a connector or port to which a headset, an earphone, an external loudspeaker and the like audio device is connected for the transmission or output of an audio signal to the audio device. The wired interface 121 may include a connector or port based on network transmission standards such as Ethernet. For example, the wired interface 121 may be implemented as a local area network (LAN) connected, directly or indirectly, to a router or a gateway by a wire.

The wired interface 121 is connected, directly or indirectly, to a set-top box, an optical media reproducing device or the like external device, an external display apparatus, a loudspeaker, a server, etc. through the connector or port by 1:1 or 1:N (where, N is a natural number), thereby receiving a video/audio signal from the external device or transmitting a video/audio signal to the external device. The wired interface 121 may include connectors or ports for individually transmitting video/audio signals.

The wired interface 121 may be implemented by a communication circuitry including wireless communication modules (e.g., an S/W module, a chip, etc.) corresponding to various kinds of communication protocols.

According to an embodiment, the wired interface 121 may be built-in the electronic apparatus 10 or implemented as a dongle or a module and detachably connected to the connector of the electronic apparatus 10.

The interface 120 may include a wireless interface 122.

The wireless interface 122 may be variously implemented corresponding implementation of the electronic apparatus 10. For example, the wireless interface 122 may employ wireless communication methods such as radio frequency, Zigbee, Bluetooth, Wi-Fi, ultrawideband (UWB), near field communication (NFC), etc.

The wireless interface 122 may be implemented by a communication circuitry including wired or wireless communication modules (e.g., an S/W module, a chip, etc.) corresponding to various kinds of communication protocols.

According to an embodiment, the wireless interface 122 includes a wireless local area network (WLAN) unit. The WLAN unit may be wirelessly connected to external apparatuses through an access point (AP) under control of a main processor 180. The WLAN unit includes a Wi-Fi communication module.

According to an embodiment, the wireless interface 122 includes a wireless communication module supporting one-to-one direct communication between the electronic apparatus 10 and the external apparatus wirelessly without the AP. The wireless communication module may be implemented to support Wi-Fi direct, BT, BLE, or the like communication method. When the electronic apparatus 10 performs direct communication with the external apparatus, a storage 140 may be configured to store identification information (e.g., media access control (MAC) address or Internet protocol (IP) address) about the external apparatus with which the communication will be performed.

In the electronic apparatus 10 according to an example embodiment, the wireless interface 122 is configured to perform wireless communication with the external apparatus by at least one of the WLAN unit and the wireless communication module according to its performance.

According to an alternative embodiment, the wireless interface 122 may further include a communication module based on various communication methods such as long-term evolution (LTE) or the like mobile communication, electromagnetic (EM) communication including a magnetic field, visible light communication (VLC), etc.

The wireless interface 122 may wirelessly communicate with the external apparatus such as the server on the network, thereby transmitting and receiving a data packet to and from the external apparatus.

The wireless interface 122 may include an IR transmitter and/or an IR receiver to transmit and/or receive an infrared (IR) signal according to IR communication standards. The wireless interface 122 may receive or input a remote-control signal from a remote controller or other external apparatuses or transmit or output a remote-control signal to other external apparatuses through the IR transmitter and/or IR receiver. Alternatively, the electronic apparatus 10 may exchange a remote-control signal with the remote controller or other external apparatuses through the wireless interface 122 based on another method such as Wi-Fi, BT, etc.

According to an embodiment, the wireless interface 122 may transmit predetermined data as information about a user voice received through the microphone or the like voice input to the server or the like external apparatus. Here, there are no limits to the format/kind of data to be transmitted, and the data may, for example, include an audio signal corresponding to a voice uttered by a user, voice features extracted from the audio signal, etc.

Further, the wireless interface 122 may receive data based on a processing result of a corresponding user voice from the server or the like external apparatus. The electronic apparatus 10 may output a sound corresponding to the voice processing result through an internal or external loudspeaker, based on the received data.

However, the foregoing embodiment is merely an example, and the user voice may be processed by the electronic apparatus 10 without being transmitted to the server. In other words, according to an alternative embodiment, the electronic apparatus 10 may be implemented to serve as a speech-to-text (STT) server.

The electronic apparatus 10 may communicate with the remote controller or the like input device through the wireless interface 122, and receive a sound signal corresponding to the user voice from the input device.

In the electronic apparatus 10 according to an embodiment, a communication module for communicating with the server or the like external apparatus and a communication module for communicating with the remote controller may be different from each other. For example, the electronic apparatus 10 may use an Ethernet modem or a Wi-Fi module to communicate with the external apparatus, and use a Bluetooth module to communicate with the remote controller.

In the electronic apparatus 10 according to an alternative embodiment, a communication module for communicating with the server or the like external apparatus and a communication module for communicating with the remote controller may be the same with each other. For example, the electronic apparatus 10 may use the Bluetooth module to communicate with the external apparatus and the remote controller.

According to an embodiment, the wireless interface 122 may be built-in the electronic apparatus 10 or implemented as a dongle or a module and detachably connected to the connector of the electronic apparatus 10.

According to an embodiment, the electronic apparatus 10 may receive a broadcast signal through the interface 120. The electronic apparatus 10 may extract or generate the first signal (or the video signal) corresponding to the first image and the second signal (or the graphic signal) corresponding to the second image based on data embedded in the broadcast signal.

According to an embodiment, the electronic apparatus 10 may receive a content signal from the server or the like external apparatus through the interface 120 by a real-time streaming method. The electronic apparatus 10 may extract or generate the first signal for the video signal) corresponding to the first image and the second signal (or the graphic signal) corresponding to the second image based on the content signal.

The electronic apparatus 10 may include a user input receiver 130.

The user input receiver 130 transmits various preset control instructions or unrestricted information to the main processor 180 (to be described later) in response to a user input.

The user input receiver 130 may include various input means for receiving a user's input, including input circuitry.

According to an embodiment, the user input receiver 130 may include a keypad (or an input panel) including a power key, a numeral key, a menu key or the like buttons provided in the electronic apparatus 10.

According to an embodiment, the user input receiver 130 includes an input device that generates a command/data/information/signal previously set to remotely control the electronic apparatus 10 and transmits it to the electronic apparatus 10. The input device may for example include a remote controller, a game console, a keyboard, a mouse, etc. and receive a user input as separated from the electronic apparatus 10.

The remote controller may include at least one button for receiving a user's input. According to an embodiment, the remote controller may include a touch sensor for receiving a user's touch input and/or a motion sensor for detecting the remote controller's own motion caused by a user. According to an embodiment, the input device includes a terminal such as a smartphone in which a remote-control application is installed. In this case, the input device can receive a user's touch input through the touch screen.

The input device is used as an external apparatus that performs wireless communication with the main body of the electronic apparatus 10, in which the wireless communication is based on Bluetooth, IrDA, RF communication, WLAN, or Wi-Fi direct.

According to an embodiment, the user input receiver 130 may include a voice input unit for receiving a voice/sound uttered by a user. The voice input unit may be implemented as a microphone capable of receiving a user's voice, and the microphone may be provided in the electronic apparatus 10, provided separately from the electronic apparatus 10, or provided in another device, for example, a remote controller separated from the electronic apparatus 10.

According to an embodiment, the user input receiver 130 may include a motion detector that detects a user's hand motion, e.g., a hand gesture (hereinafter referred to as a 'gesture'). The motion detector of the electronic apparatus 10 may output data by detecting the moving distance, the moving speed, the area of a moving region, etc. of a hand.

The electronic apparatus 10 may include the storage 140.

The storage 140 may be configured to store various pieces of data of the electronic apparatus 10.

The storage 140 may be implemented by a nonvolatile memory (or a writable read only memory (ROM)) which can retain data even though the electronic apparatus 10 is powered off, and mirror changes. That is, the storage 140 may include one among a flash memory, an HDD, an erasable programmable ROM (EPROM) or an electrically erasable programmable ROM (EEPROM). The storage 140 may further include a volatile memory such as a dynamic random-access memory (DRAM) or a static random-access memory (SRAM), of which reading or writing speed for the electronic apparatus 10 is faster than that of the nonvolatile memory.

Data stored in the storage 140 may for example include not only an OS for driving the electronic apparatus 10 but also various programs, applications, image data, appended data, etc. executable on the OS.

Specifically, the storage 140 may be configured to store a signal or data input/output corresponding to operations of the elements under control of the main processor 180. The storage 140 may be configured to store a control program for controlling the electronic apparatus 10, an application provided by the manufacturer or downloaded from the outside, a relevant UI, graphics or images for providing the UI, user information, documents, databases, or the concerned data.

According to an embodiment, the storage 140 may be configured to store a TV application or a TV client as a program for operating the electronic apparatus 10 as a TV, and a VOD application as a program for reproducing content received from the server and the like external apparatus.

According to an embodiment, the images, e.g., the first image (the video) and the second image (the graphic) displayed in the electronic apparatus 10 may be based on data stored in a flash memory, a hard disk, or the like nonvolatile storage 140. The storage 140 may be provided inside or outside the electronic apparatus 10, and the storage 140 provided outside may be connected to the electronic apparatus 10 via the wired interface 121.

According to an example embodiment, the term 'storage' is defined to include the storage 140, the ROM (not shown) in the main processor 180, a RAM (not shown) or a memory card (not shown, e.g., a micro-SD card, a memory stick, etc.) mountable to the electronic apparatus 10.

The electronic apparatus 10 may include a first processor 150.

The first processor 150 (hereinafter referred to as the video processor) ma process the first signal, e.g., the video signal, so that the corresponding first image can be displayed on the display 110.

The electronic apparatus 10 according to an example embodiment may process the video signal through a first path, e.g., a video path using the first processor 150. Here, the first path is distinguished from a second path, e.g., a graphic path using a second processor 160 (to be described later) for processing the graphic signal.

Figure 3:
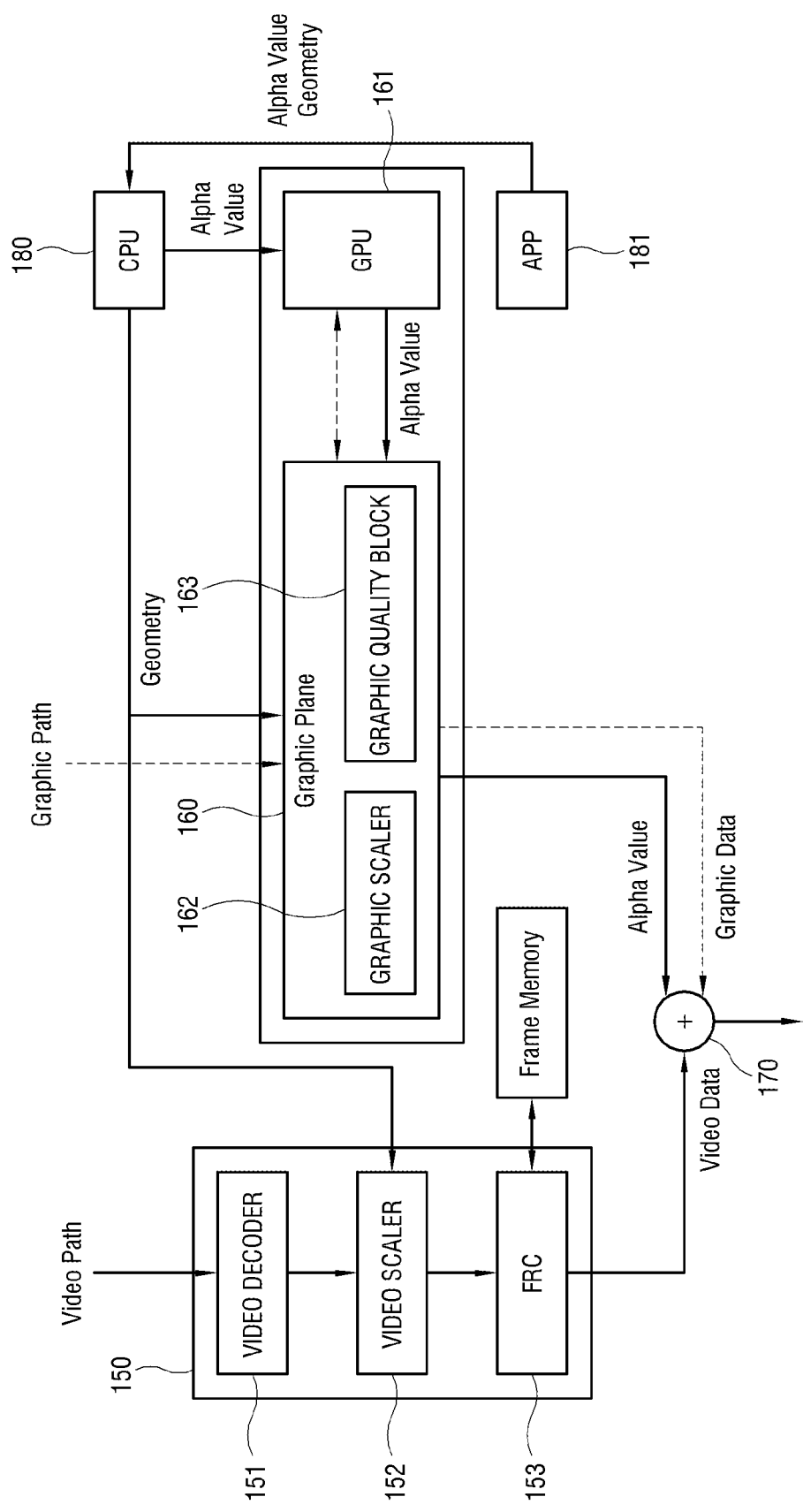
FIG. 3 is a block diagram showing paths through which a video signal and a graphic signal are processed in an electronic apparatus according to an example embodiment.

FIG. 3 is a block diagram showing paths through which a video signal and a graphic signal are processed in an electronic apparatus according to an example embodiment.

The first processor 150 is configured to perform various processes previously set with respect to the first image signal, e.g., the video signal, and may, as shown in FIG. 3, include a video decoder 151 for decoding the image signal to match the image format of the electronic apparatus 10.

According to an embodiment, the video decoder may for example be implemented by an H.264/AVC decoder, but not limited thereto. In other words, the video decoder in this embodiment may for example be implemented by a moving picture experts group (MPEG) decoder, a high efficiency video codec (HEVC) decoder, or the like decoders corresponding to various compression standards.

The video decoder may be implemented as a hardware decoder or a software decoder.

According to an embodiment, the electronic apparatus 10 may include a plurality of video decoders. Here, the plurality of video decoders provided in the electronic apparatus 10 may be each implemented as the hardware decoder or the software decoder, or implemented in the form of combination of the hardware decoder and the software decoder.

The first processor 150 may include a video scaler (hereinafter referred to as a V scaler) 152 configured to adjust the first signal, e.g., the video signal, to match the output format, e.g., the panel specifications of the display 110.

According to an embodiment, the video scaler 152 may process a video signal according to frames in response to a sync signal. Here, the sync signal may for example a vertical sync signal Vsync for the display 110.

Specifically, the video scaler 152 may process, e.g., scale a plurality of video frames of the video signal based on the sync signal, e.g., the vertical sync signal for the display 110.

According to an embodiment, the video scaler 152 may be implemented by hardware, for example a chip, and outputs the plurality of video frames subjected to the scaling to be stored in a buffer or frame buffer, (hereinafter referred to as a video buffer). Here, the buffer may for example be provided in the storage 140 (e.g., see FIG. 2) implemented as the memory such as the DRAM. Each video scaler herein, and each graphic scaler herein, may comprise circuitry.

The video scaler 152 may scale and output the video frame based on geometry information identified or set by software, e.g., an application (APP) 181 installed in the electronic apparatus 10.

Here, the geometry information may include size information and position information of the first image, e.g., the video corresponding to the video signal. In other words, the geometry information may for example include coordinate values (x, y, w, h) as geometry parameters for representing the video and the graphic.

Further, the geometry information may include information about a start point and an end point of the second image, e.g., the graphic corresponding to the graphic signal. Each frame of the graphic signal may be controlled to be output in a section between the start point and the end point.

According to an embodiment, the geometry information may be, as shown in FIG. 3, transmitted from the main processor 180 (to be described later), e.g., a central processing unit (CPU) to the video scaler 152. The main processor 180, e.g., the CPU may execute the application 181 installed in the electronic apparatus 10, obtain the geometry information or data from the executed application, and provide the obtained geometry information or data to the video scaler 152. Here, the application 181 may generate an alpha value representing the transparency information of the graphic together with the geometry information and provide the generated alpha value to the main processor 180, e.g., the CPU.

The video scaler 152 may adjust the size and position of the image corresponding to the video signal, e.g., the video based on the geometry information received from the CPU 180, and generate the output image, e.g., the video.

According to an embodiment, the first processor 150 may include a frame rate converter (FRC) 153 that performs frame rate conversion (FRC) for the first signal, e.g., the video signal output from the video scaler 152.

The frame rate converter 153 may be implemented by a hardware chip separate from the video scaler 152, or may be designed as a single chip into which the video scaler 152 and the frame rate converter 153 are integrated.

By the frame rate conversion (FRC), the number of frames per second of the first image output to the display 110 may be converted. In this process, a video frame delay, in which the first signal (e.g., the video signal) is delayed, may be generated in this process.

Such a video frame delay may be generated in the FRC regardless of the synchronization of the video signal based on the foregoing sync signal.

Further, the generation of the video frame delay due to the FRC may depend on the types of the video signal. For example, the video frame delay due to the FRC may be generated by predetermined number of frames, e.g., three frames in a video mode for a movie, but the video frame delay due to the FRC may not be generated in a game mode. In this case, the electronic apparatus 10 may identify the video frame delay due to the FRC according to its operation modes.

Meanwhile, the first processor 150 may for example perform at least one of various processes such as de-interlacing for converting an interlaced broadcast signal into a progressive broadcast signal, noise reduction for improving image quality, detail enhancement, frame refresh rate conversion, and line scanning to process the video signal. However, this is merely an example, and a configuration for performing the foregoing processes may be provided additionally.

The electronic apparatus 10 may include the second processor 160.

The second processor 160 (hereinafter referred to as a graphic processor) may process the second signal, e.g., the graphic signal so that the second image corresponding to the processed second signal can be displayed on the display 110.

The second processor 160 processes the graphic signal through the second path (e.g., the graphic path) different from the first path for the video signal processed by the first processor 150.

The second processor 160 is configured to perform various processes for the second image signal, e.g., the graphic signal, and may, as shown in FIG. 3, include a graphic processing unit (GPU) 161 that performs computation for processing a graphic.

According to an embodiment, the GPU 161 may perform at least one of various preset processes for the second image signal, e.g., the graphic signal, received from the server or the like external apparatus or embedded in the electronic apparatus 10, for example, various processes such as animation process, color conversion, gamma conversion, and acceleration process. However, the disclosure is not limited to this embodiment, and the GPU 161 may further perform various graphic processes in addition to the foregoing processes. Further, as necessary, the electronic apparatus 10 may further include a configuration for processing the graphic signal.

The GPU 161 may obtain the geometry information and the alpha value from the main processor 180, e.g., the CPU, and transmit the geometry information and the alpha value to a graphic scaler 162 and a graphic quality block 163.

The second processor 160 may include the graphic scaler (hereinafter referred to as a G scaler) 162 to output a graphic corresponding to the second signal, e.g., the graphic signal to the display 110. The graphic scaler 162 may be, as shown in FIG. 3, provided in a graphic plane (GP) block controlled by the GPU 161.

According to an embodiment, the graphic scaler 162 may process the graphic signal according to the frames in response to the sync signal. Here, the sync signal may for example be a vertical sync signal Vsync for the display 110. The vertical sync signal may be provided from the main processor 180, e.g., the CPU to the graphic scaler 162 of the GP block through the GPU 161.

According to an embodiment, the graphic scaler 162 may be embodied by hardware, for example, a chip, so that the graphic frames can be stored and output in sequence to a buffer or frame buffer (hereinafter referred to as a graphic buffer). Here, the buffer may for example be provided in the storage 140 implemented as the memory such as the DRAM.

The graphic scaler 162 may scale the graphic frame based on the geometry information identified or set by the software, e.g., the application 181 installed in the electronic apparatus 10.

Specifically, the graphic scaler 162 may output the graphic frame based on a preset pointer (or a rendering pointer, for example, the start point and the end point included in the geometry information after the graphic is rendered in the buffer by the application 181. Here, the pointer is variable, and may for example be set or applied with respect to the vertical sync signal Vsync for the display 110. According to an embodiment, the application 181 may be executed by the main processor 180, and perform rendering for the graphic signal.

According to an embodiment, the vertical sync signal of the display 110 may be provided to the graphic scaler 162 through the video scaler 152, so that the graphic frames rendered in the buffer can be output in sequence by the graphic scaler 162.

The second processor 160 may include the graphic quality block 163 for processing the graphic quality of the graphic. The graphic quality block 163 may, as shown in FIG. 3, be provided in the GP block controlled by the GPU 161.

According to an embodiment, the GP block may start operating in response to the vertical sync signal for the display 110 received from the video scaler 152. The GPU 161 may receive the alpha value generated in the application 181 through the main processor 180, e.g., the CPU, and transmit the received alpha value to the GP block. Further, the GPU 161 may transmit the geometry information obtained from the main processor 180, e.g., the CPU to the GP block.

The graphic signal is adjusted for the size and position of the graphic based on the geometry information through the graphic scaler 162 forming the second path, e.g., the graphic path, and also subjected to the graphic quality process through the graphic quality block 163.

The electronic apparatus 10 may include a mixer 170.

The mixer 170 (e.g., see FIGS. 2, 3, 5, 9, 10, and 13) may mix the first signal and the second signal so that the first image (e.g., the video) corresponding to the first signal (e.g., the video signal) processed by the first processor 150 and the second image (e.g., the graphic) corresponding to the second signal (e.g., the graphic signal) processed by the second processor 160 can be displayed together on the display 110.

The mixer 170 may merge the first signal (e.g., the video signal) and the second signal (e.g., the graphic signal) and output the merged signal to the display 110.

According to an embodiment, the mixer 170 may be embodied by hardware, for example, a chip, and finally output the synchronized the video and graphic frames to the display 110.

The mixer 170 may, as shown in FIG. 3, receive the graphic signal (e.g., the graphic data) output via the GP block, e.g., the graphic scaler 162 and the graphic quality block 163, and the video signal (e.g., the video data) output from the video scaler 152 or the FRC 153. The mixer 170 may mix the received video and graphic data.

According to an embodiment, the mixer 170 may perform alpha blending to synthesize images based on transparency information about a degree of transparency of an image to be overlaid, e.g., the second image (e.g., the graphic). The transparency information is generally called the alpha value, and the alpha value may for example be 8-bit data to distinguish the degree of transparency from '0' to '255'.

The mixer 170 may merge, e.g., mix the video signal and the graphic signal based on a predetermined algorithm with reference to the alpha value representing the transparency information. The image including the video and the graphic merged, e.g., subjected to the alpha blending based on the alpha value in the mixer 170 may be output through the display 110. Here, the mixer 170 may use various known algorithms, but is not limited to a specific method.

According to an embodiment, the mixer 170 may merge a lower layer corresponding to the video signal such as a broadcast and an upper layer corresponding to the graphic signal such as a subpicture, a subtitle, a teletext, and an OSD.

As above, the first signal (e.g., the video signal) and the second signal (e.g., the graphic signal) are mixed by the mixer 170 and output to the display 110, so that the two images, in other words, the first image (e.g., the video) and the second image (e.g., the graphic) can be displayed together on one screen of the display 110.

The electronic apparatus 10 may include the main processor 180.

The main processor 180 performs control to operate general components of the electronic apparatus 10. The main processor 180 may include a control program (or an instruction) for performing such control operations, a nonvolatile memory in which the control program is installed, a volatile memory such as a dynamic RAM (DRAM) in which at least a part of the installed control program is loaded, and at least one processor, e.g., a microprocessor, an application processor, or a CPU, for executing the loaded control program.

A processor for the main processor 180 may include a single-core processor, a dual-core processor, a triple-core processor, a quad-core processor, and the like multiple-core processor. Further, the processor, the ROM, and the RAM may be connected to one another through an internal bus.

According to an embodiment, the processor may include a plurality of processors. For example, the electronic apparatus 10 may separately include a sub processor that operates only with standby power in a sleep mode where the electronic apparatus 10 does not fully operate.

According to an embodiment, the main processor 180 may execute the application 181 installed in the electronic apparatus 10, and identify the geometry information for displaying the first image (e.g., the video) corresponding to the video signal and the second image (e.g., the graphic) corresponding to the graphic signal. The identified geometry information, for example, the information about the size and position of the video may be provided to the video scaler 152.

Further, the main processor 180 may execute the application 181 to perform rendering based on the graphic signal in the buffer. Such a rendered graphic image may be controlled to be output by the graphic scaler 162 based on the pointer including the identified geometry information, for example, the information about the start and end points of the graphic.

According to an embodiment, the main processor 180 may be implemented as included in the main SoC mounted to the PCB internally provided in the electronic apparatus 10.

The control program may include a program(s) achieved by at least one of a BIOS, a device driver, an OS, a firmware, a platform, or an application. According to an exemplary embodiment, the application program may be previously installed or stored in the electronic apparatus 10 when the electronic apparatus 10 is manufactured, or may be installed in the electronic apparatus 10 on the basis of application data received from the outside when it is required in the future. The application data may for example be downloaded from an external server such as an application market to the electronic apparatus 10. Such an external server is merely an example of a computer program product according to the disclosure, but not limited thereto.

The control program may be recorded in a storage medium readable by a machine such as a computer. The machine-readable storage medium may be provided in the form of a non-transitory storage medium or a non-volatile storage medium. Here, the term 'non-transitory storage medium' means a tangible device and does not include a signal (e.g., an electromagnetic wave), and this term does not distinguish between a case where data is semi-permanently stored in the storage medium and a case where data is temporarily stored. For example, the 'non-transitory storage medium' may include a buffer in which data is temporarily stored.

Figure 4:
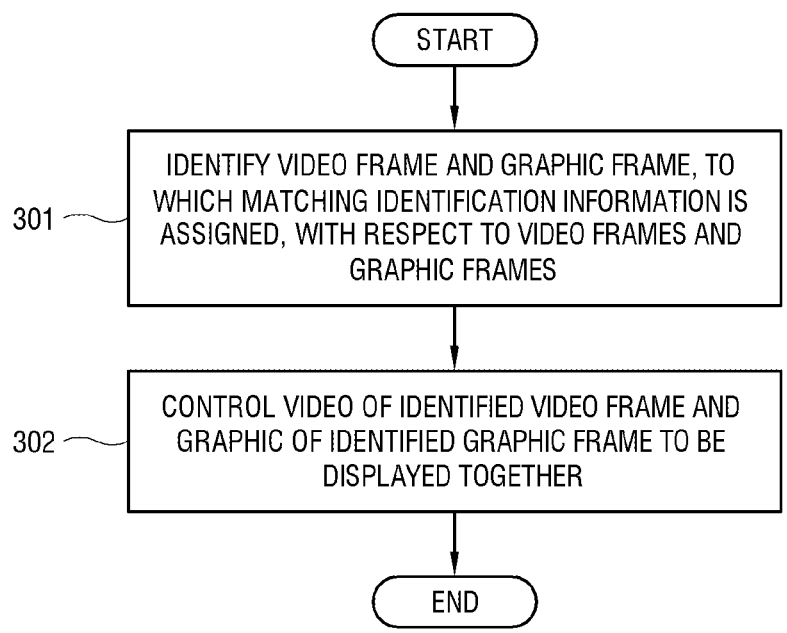
FIG. 4 is a flowchart showing control operations for displaying an image in an electronic apparatus according to an example embodiment.

FIG. 4 is a flowchart showing control operations of displaying the images in an electronic apparatus according to an example embodiment.

According to an embodiment, the first processor 150 and the second processor 160 of the electronic apparatus 10 may process and output images for each frame in response to the sync signal. Specifically, the first processor 150 may process the first signal, e.g., the video signal in response to the sync signal, so that the first image, e.g., the video can be output in units of frames. Further, the second processor 160 may process the second signal, e.g., the graphic signal in response to the sync signal, so that the second image, e.g., the graphic can be output in units of frames.

The two images, e.g., the first image (e.g., the video) and the second image (e.g., the graphic), output from the first processor 150 and the second processor 160 may be mixed, e.g., merged to be displayed together on the display 110 by the mixer 170.

As shown in FIG. 4, in operation 301 for example, the main processor 180 may identify the video frame and the graphic frame, to which matching identification information is assigned, with respect to the plurality of frames for the first signal, e.g., the video signal and the plurality of frames for the second signal, e.g., the graphic signal (e.g., operation 301).

Here, the identified video and graphic frames may form a pair respectively corresponding to the video and the graphic to be displayed together on the display 110. For example, one frame V1 among the plurality of frames for the video signal and one frame G1 to be displayed together with the frame V1 among the plurality of frames for the graphic signal the frame V1 may be identified as one pair of frames.

The main processor 180 may control the video processor 150 and the graphic processor 160 to display the images corresponding to one pair of frames identified in the operation 301, e.g., the image (video) of the video frame V1 and the graphic of the graphic frame G1 together on one screen (e.g., operation 302 in FIG. 4). In the control process of the operation 302, the identified video frame V1 may be controlled to be delayed and output from the video processor 150 or the graphic frame G1 may be controlled to be delayed and output from the graphic processor 160, so that the image of the identified video frame V1 and the graphic of the identified graphic frame G1 can be displayed together on the display 110. Each "processor" herein comprises processing circuitry.

According to an embodiment, the foregoing operations of the main processor 180 may be implemented by a computer program stored in the computer program product (not shown) provided separately from the electronic apparatus 10.

In this case, the computer program product includes a non-transitory or non-volatile memory in which an instruction corresponding to a computer program is stored, and a processor. The instruction may be executed by the processor to identify the video frame and the graphic frame, to which identification numbers matching each other are assigned, among the plurality of video frames and the plurality of the graphic frame, and delay and output at least one among the identified video and graphic frames so that the image of the identified video frame and the graphic of the identified graphic frame can be displayed together.

Therefore, the electronic apparatus 10 may download and execute a computer program stored in a separate computer program product, and perform the operations of the main processor 180.

Below, embodiments of synchronizing and outputting images in an electronic apparatus according to the disclosure will be described with reference to the accompanying drawings.

Figure 5:
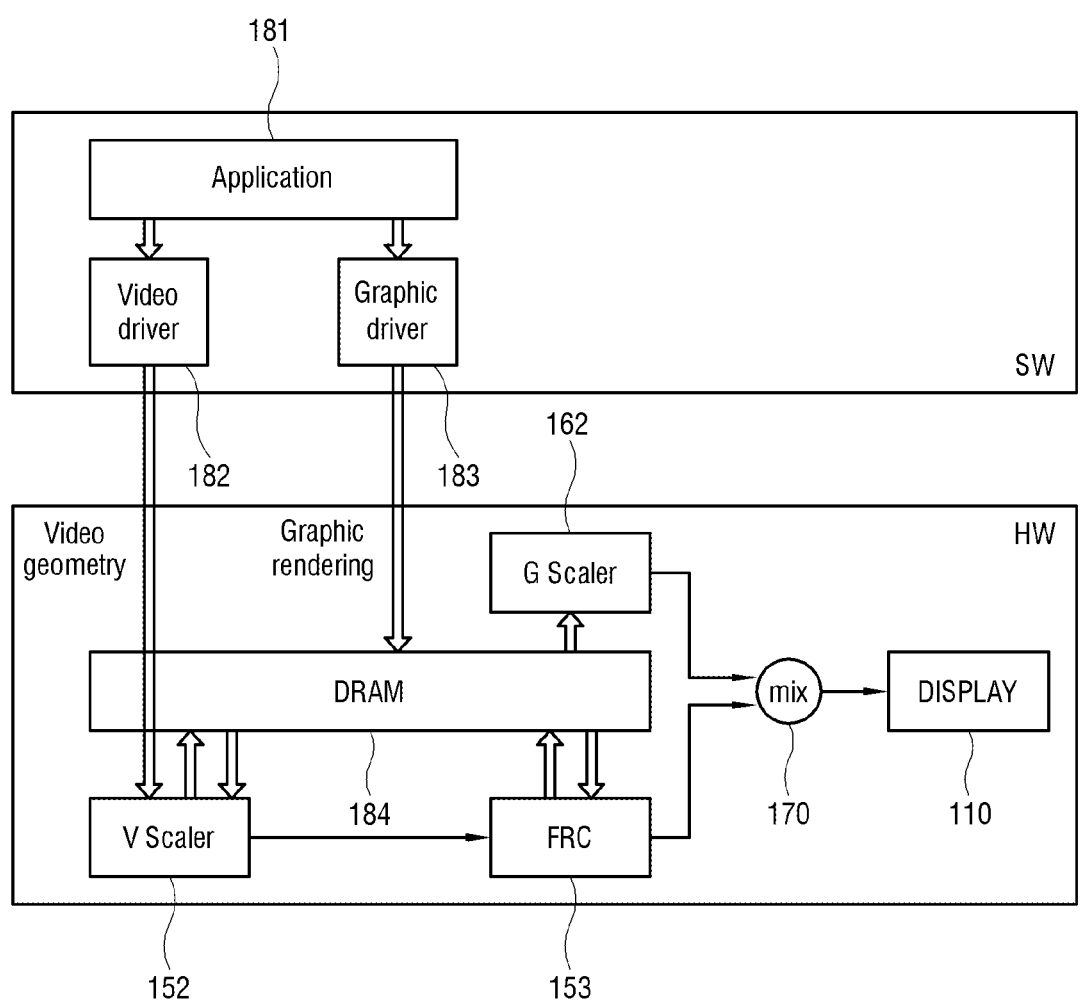
FIG. 5 is a view schematically showing operations of configurations for displaying a first image and a second image together in an electronic apparatus according to an example embodiment.

FIG. 5 is a view schematically showing operations of configurations for displaying a first image and a second image together in an electronic apparatus according to an example embodiment.

In the electronic apparatus 10 according to an embodiment, as shown in FIG. 5, a video driver 182 and a graphic driver 183 may be executed by the main processor 180 in the software layer of the application 181, and information may be transmitted to the video scaler (V Scaler) 152 and the graphic scaler (G Scaler) 162.

The video driver 182 may, for example, set a video geometry for displaying the first image (video), and transmit the set geometry information to the video scaler 152. Here, the geometry information may include information about the size and position of the video.

The graphic driver 183 may, for example, perform graphic rendering (or image rendering) for displaying the second image (graphic) in a buffer of a memory (e.g., DRAM) 184, set a buffer pointer, and transmit set pointer information to the graphic scaler 162. Here, the pointer information includes information about the start and end points of the graphic, so that each frame of the rendered graphic can be output in a section between the start point and the end point.

The video scaler 152 may perform scaling for each frame (video frame) of the first signal, e.g., the video signal processed by the video decoder 151 based on the geometry, and output the video frame subjected to the scaling to the mixer 170.

According to an embodiment, the video frame subjected to the scaling in the video scaler 152 undergoes the frame rate conversion in the frame rate converter (FRC) 153, and then output to the mixer 170. In other words, the video frame output from the video scaler 152 is transmitted to the frame rate converter (FRC) 153, subjected to the frame rate conversion in the frame rate converter 153, and provided to the mixer 170 so as to be mixed with the graphic frame. Each "converter" herein comprises circuitry.

The graphic scaler 162 may output each frame (graphic frame) of the second signal, e.g., the graphic signal, which has been subjected to the image rendering in the buffer, to the mixer 170.

The mixer 170 may mix the video frame provided from the video scaler 152 or the frame rate converter 153 and the graphic frame provided from the graphic scaler 162, and output the mixed frame to the display 110, so that the first image (video) and the second image (graphic) matching each other can be displayed together on the display 110.

The foregoing processing and mixing of the video and the graphic and the foregoing transmission of information may be equally carried out even in the embodiments to be described later with reference to FIGS. 8 and 12.

However, on the contrary to the disclosure, a distortion of an image may occur in the related art where a video and a graphic are displayed together.

Figure 6:
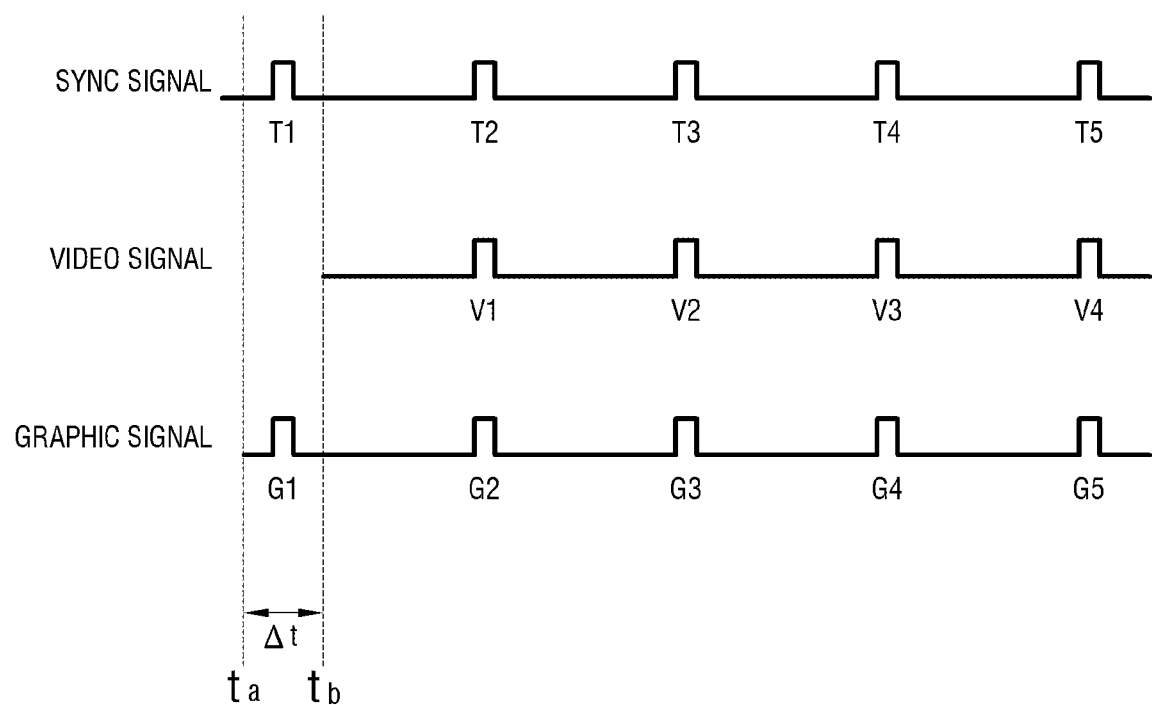
FIG. 6 is a view for explaining a case where a distortion of an image occurs when a video and a graphic are displayed together in the related art.
Figure 7:
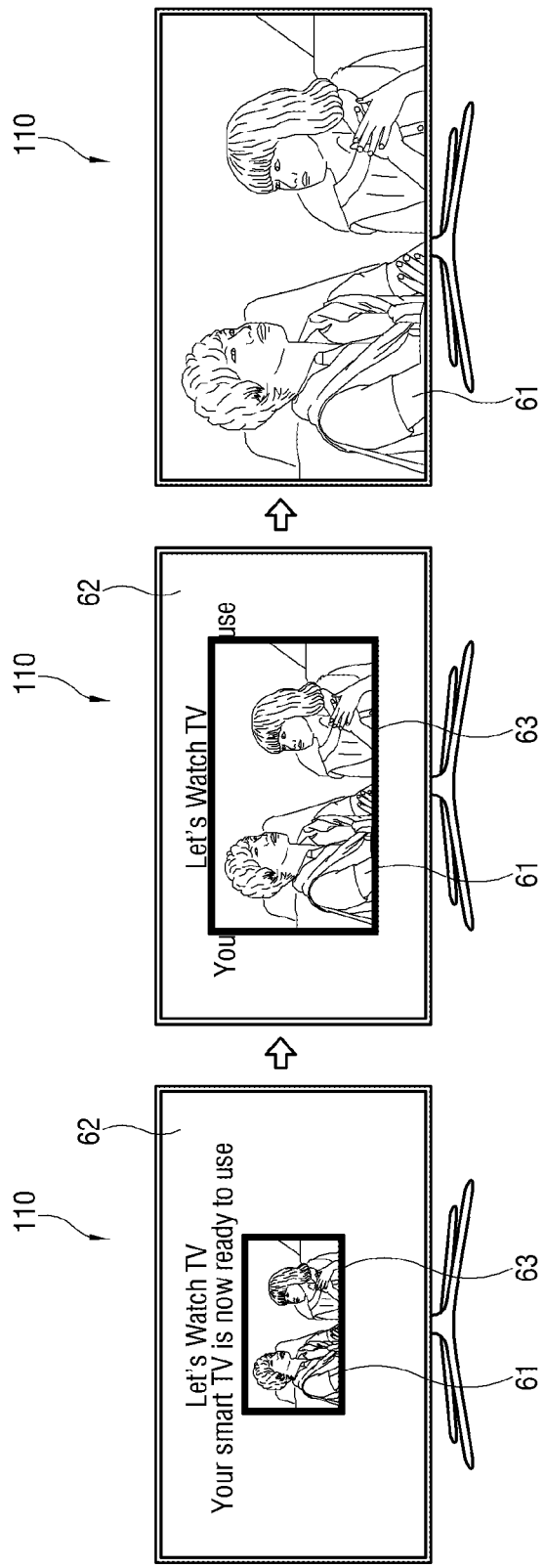
FIG. 7 is a view showing an example that a distortion of an image occurs in the related art.

FIG. 6 is a view for explaining a case where a distortion of an image occurs when a video and a graphic are displayed together in the related art, and FIG. 7 is a view showing an example that a distortion of an image occurs in the related art.

In the related art shown in FIG. 6, a video signal and a graphic signal may be processed for each frame in response to a predetermined sync signal. Here, the sync signal may use a vertical sync signal Vsync for the display 110 on which the image is displayed.

However, even when the geometry is simultaneously set for both the video signal and the graphic signal in the layer of the application 181, any one of both signals may be delayed. For example, the data of the video signal may arrive at the video scaler 152 later than the first vertical sync signal of the display 110.

Referring to FIG. 6, as the data of the graphic signal arrives a point in time ta, the graphic scaler 162 may control the first graphic frame G1 to be output at a point int time of the first pulse the vertical sync signal, e.g., the timing T1.

However, as the data of the video signal arrives at a point in time $t_b$ later than the data of the graphic signal by a predetermined time Δt, the video scaler 152 controls the first video frame V1 to be output at the timing T2 of the second pulse of the vertical sync signal as shown in FIG. 6. Further, the graphic scaler 162 may control the second graphic frame G2 to be output at the same timing T2 of the second pulse.

In other words, in the related art of FIG. 6, it is impossible to identify whether the video frame and the graphic frame output simultaneously are matched each other, and therefore the video frame V1 and the graphic frame G1 to be displayed on one screen are output at different points in time.

Therefore, the video frame V1 and the graphic frame G2 not matched each other are output simultaneously, and thus the two images are not normally synchronized, thereby causing an image distortion.

For example, such a synchronization failure may occur in the process of out-of-box experience (OOBE), e.g., initialization process after a consumer purchases a TV, or in the process of authentication for YouTube application (App) installed in the television.

Specifically, in the final stage of the OOBE, as shown in FIG. 7, in the state that a video 61 and a graphic 62 are simultaneously displayed on a screen, a distortion of an image may occur such that a black border portion 63, e.g., a black edge between the video 61 and the graphic 62 is displayed while the area of the video 61 is gradually enlarged.

In the electronic apparatus 10 according to an example embodiment, synchronization processing is performed to prevent or reduce the foregoing distortion of the image.

Figure 8:
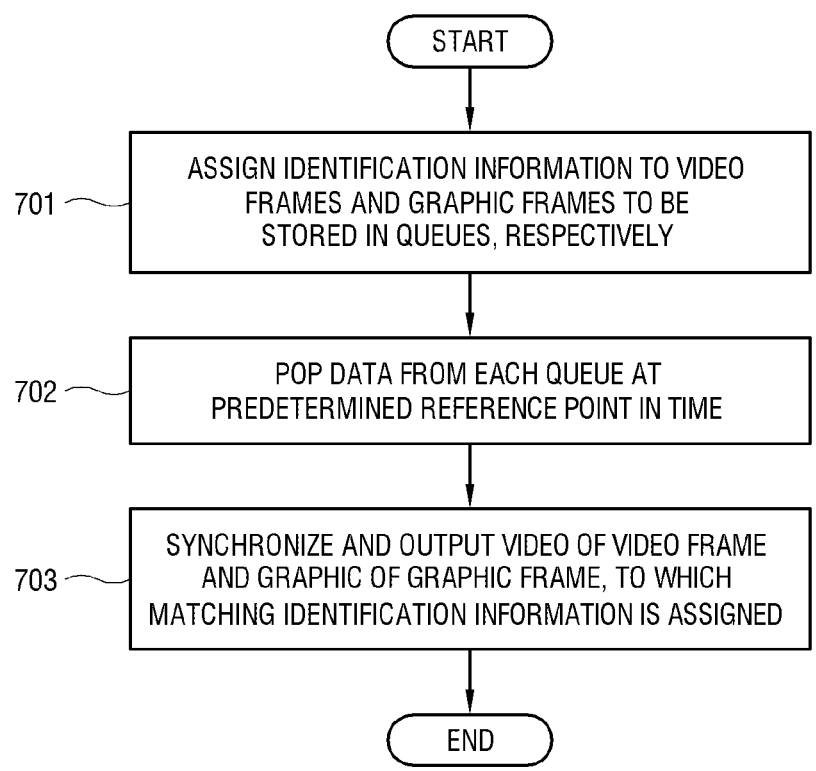
FIG. 8 is a flowchart showing control operations for synchronizing and displaying images in an electronic apparatus according to an example embodiment.
Figure 9:
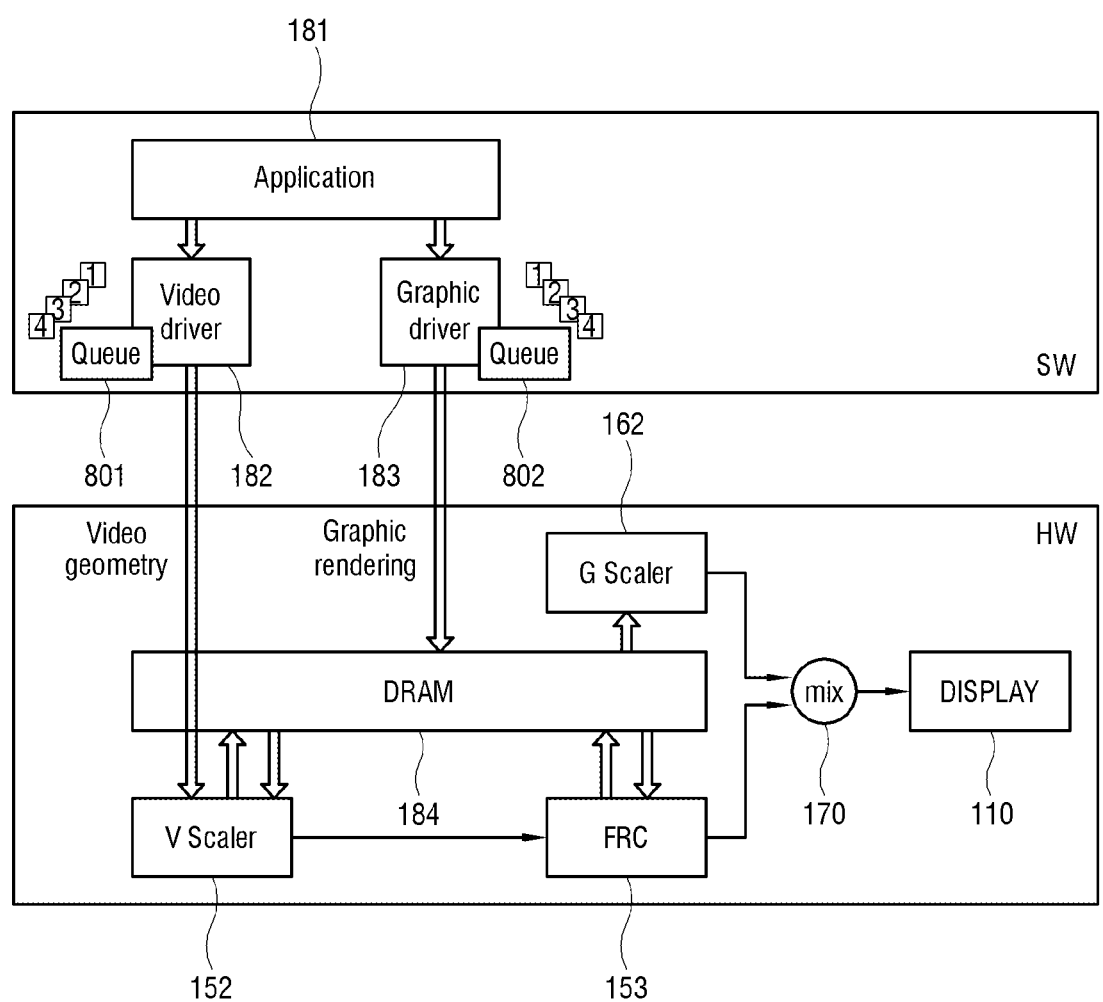
FIG. 9 is a view showing operations of configurations for synchronizing and displaying images in the example embodiment of FIG. 8.

FIG. 8 is a flowchart showing control operations for synchronizing and displaying images in an electronic apparatus according to an example embodiment, and FIG. 9 is a view showing operations of configurations for synchronizing and displaying images in the embodiment of FIG. 8.

Like the embodiment of FIG. 4, the embodiment of FIG. 8 is characterized in that at least one of the video frame and the graphic frame is controlled to be delayed by operating to identify a pair of frames to be displayed together based on identification information, e.g., sequence numbers assigned according to the order of the frames, assigning the identification numbers to the video frame and the graphic frame, storing the data of the video frame and the graphic frame assigned with the identification numbers in the queue, and then popping the stored data.

According to an embodiment, the electronic apparatus 10 may operate in a mode for synchronizing the video and the graphic, and control the synchronization processing (to be described later) to be performed.

The main processor 180 of the electronic apparatus 10 may, as shown in FIG. 8, assign or match the identification information such as numbers, e.g., sequence numbers to the frames (video frames) of the first signal, e.g., the video signal and frames (graphic frames) of the second signal, e.g., the graphic signal, and store the data of the video signal and the data of the graphic signal, to which the numbers for each frame are assigned, in each queue (701). Here, the queue has a format of storing the data in the first-in, first-out (FIFO) method, so that the data of the video and graphic frames can be sequentially stored in and output from the queues.

In the operation 701, the main processor 180 may assign the identification information for each frame to the video signal and the graphic signal based on the execution, e.g., start of the synchronization mode, so that the data of the video and graphic frames, for example, the information about the size and position of the video as the geometry information and the information about the rendering pointer of the graphic can be stored, e.g., enqueued in sequence together with their assigned numbers.

Referring to FIG. 9, the video driver 182 is executed by the main processor 180, assigns sequence numbers such as 1, 2, 3, 4, . . . as the identification information to the frames (video frames) of the video signal, and stores relevant data or information in a first queue 801 provided as a video geometry queue. Likewise, the graphic driver 183 is executed by the main processor 180, assigns sequence numbers such as 1, 2, 3, 4, . . . as the identification information to the frames (graphic frames) of the graphic signal, and stores relevant data or information in a second queue 802 provided as a graphic pointer queue. Therefore, the video frame and the graphic frame, which are assigned with the same identification information (or sequence number), are to be displayed together as one pair of matching frames on the display 110

The video driver 182 and the graphic driver 183 executed by the main processor 180 may control the data to be simultaneously popped, e.g., output from the queues 801 and 802, respectively, at a predetermined reference point in time (e.g., operation 702 in FIG. 8). Here, the reference point in time may be set based on a predetermined sync signal, and may, for example, be the timing T1 of the first pulse of the vertical sync signal Vsync for the display 110 as an interrupt service routine (IRS).

That is, in the embodiment shown in FIG. 9, for example, the data of the video frame V1 stored in the first queue 801 and the data of the graphic frame G1 stored in the second queue 802 may be controlled to be respectively popped, e.g., dequeued together from the queues 801 and 802 as one pair of frames, to which the matching identification information is assigned, at a reference point in time.

Thus, the data of the video frame and the data of the graphic frame are simultaneously popped from the first queue 801 and the second queue 802 at the reference point in time, and transmitted to the video scaler 152 and the graphic scaler 162, respectively.

Here, the video driver 182 may provide the geometry information (or video geometry) set for the popped video frame to the video scaler 152, and the graphic driver 183 may perform the graphic rendering for the popped graphic frame and provide the information about the buffer pointer as the geometry information to the graphic scaler 162.

According to an embodiment, the main processor 180 may compare the pieces of identification information, e.g., the sequence numbers respectively assigned to the video and graphic frames popped at the reference point in time, and control the data to be transmitted to each of the video scaler 152 and the graphic scaler 162, based on identifying that the two pieces of identification information (numbers) correspond to, e.g., match each other.

In other words, the main processor 180 may control the information about the buffer pointer and the video geometry information to be transmitted as the geometry information to each of the video scaler 152 and the graphic scaler 162 and set, when it is identified based on the result of comparison between the sequence numbers that the video frame and the graphic frame simultaneously popped from the queues 801 and 802 correspond to each other.

In addition, the main processor 180 may control the video processor 150 and the graphic processor 160 (e.g., see FIG. 2) to synchronize and output the image of the video frame V1 and the image of the graphic frame G1, to which the pieces of identification information (sequence numbers) transmitted in the operation 702 and corresponding to each other are assigned (e.g., operation 703 in FIG. 8).

Here, the main processor 180 may, for example, control the video frame V1 and the graphic frame G1 to be respectively synchronized and output from the video scaler 152 and the graphic scaler 162 at a timing T2 of the next pulse of the vertical sync signal Vsync, and provided to the mixer 170.

In the embodiment as described above, the data is simultaneously popped in the state that the data is stored in both the first queue 801 and the second queue 802, and thus the video frame and the graphic frame are necessarily controlled to be synchronized and output as a pair.

In this process, at least one of the video frame V1 and the graphic frame G1 may be controlled to be delayed. For example, when the video decoder 151 of the video processor 150 forming the video path outputs the video frame V1 to the video scaler 152 late, the graphic scaler 162 of the graphic processor 160 forming the graphic path may delay and output the graphic frame G1 (e.g., see FIG. 3). In other words, the graphic scaler 162 may receive the geometry information (or rendering pointer information) as the data of the graphic frame G1 from the queue 802, and output the graphic frame G1, which may be delayed, based on the received geometry information.

Therefore, as shown in FIG. 6, even though one frame, e.g., the graphic frame G1 arrives earlier, the graphic frame G1 is controlled to be delayed so that the video frame V1 and the graphic frame G1 can be synchronized and output together after the matching video frame V1 arrives, thereby preventing or reducing the chance of an image from being distorted as the video and the graphic not matched each other are displayed together.

According to an embodiment, the video frame scaled by the video scaler 152 may be output to the mixer 170 through the frame rate converter (FRC) 153.

Figure 10:
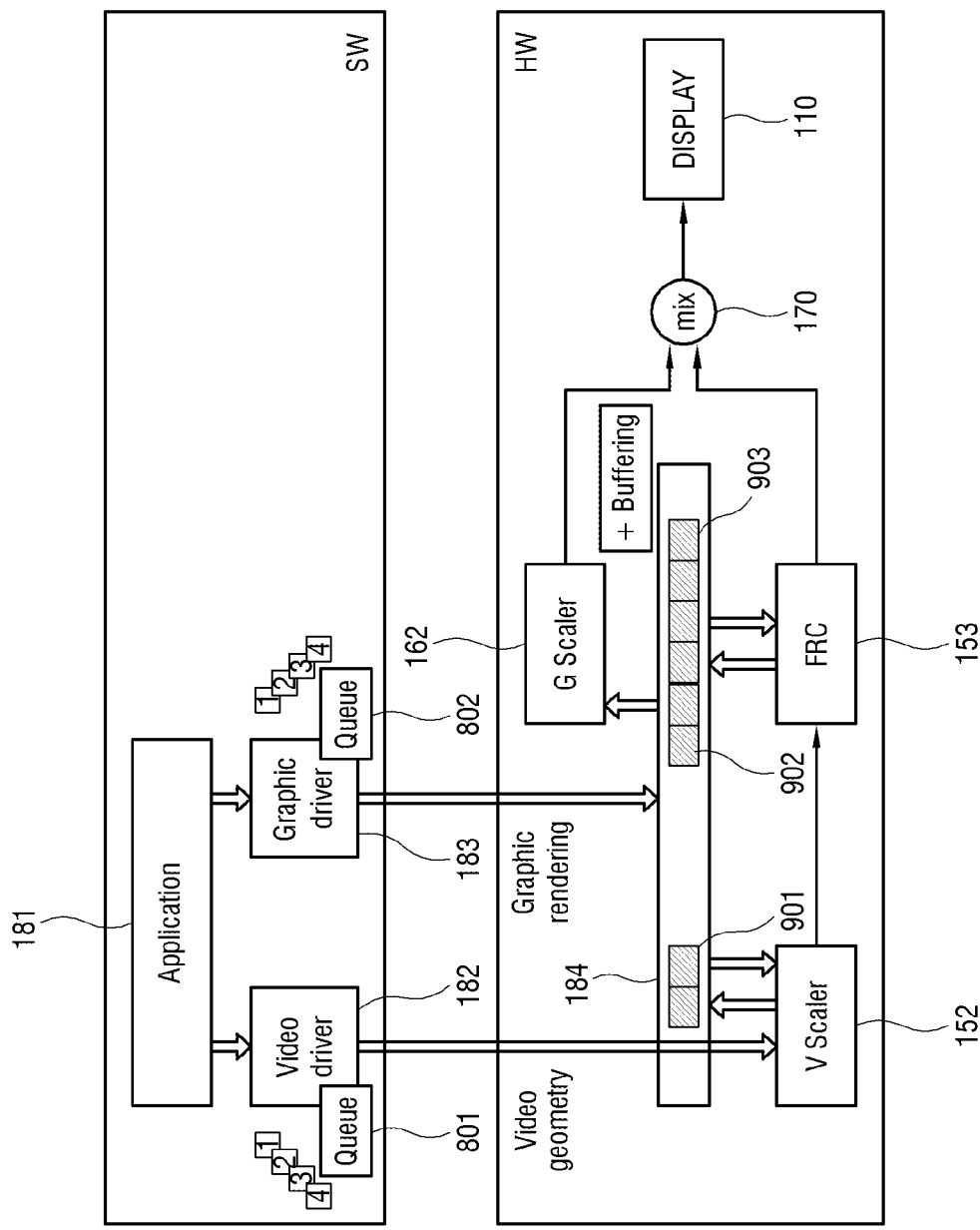
FIG. 10 is a view showing operations for synchronizing and displaying images subjected to frame rate conversion in the example embodiment of FIG. 8.

FIG. 10 is a view showing operations for synchronizing and displaying images subjected to frame rate conversion in the embodiment of FIG. 8.

The electronic apparatus 10 according to the embodiment shown in FIG. 10 may be implemented to further include a graphic buffer for additional buffering corresponding to the delayed time of the video frame occurring in the frame rate conversion of the video signal, in other words, an FRC delay.

In the electronic apparatus 10 according to an example embodiment, the memory 184 may include a video buffer 901 to sequentially store the video frames output by the video scaler 152, and a graphic buffer 902 to sequentially store the graphic frames output by the graphic scaler 162.

Further, the memory (e.g., DRAM) 184 may, as shown in FIG. 10, further include an FRC buffer 903 as the graphic buffer to store the graphic frame corresponding to an FRC delay of the video frame.

For example, when three frames are delayed while the frame rate converter 153 converts the frame rate of the video signal, the FRC buffer 903 may be configured to have a size corresponding to three frames.

Accordingly, even though the video frame output from the video scaler 152 is transmitted to the mixer 170 as being delayed during the FRC of the frame rate converter 153, the graphic frame is provided to the mixer 170 as being delayed to offset the FRC delay by the FRC buffer 903, thereby causing the video frame and the graphic frame to be synchronized and output.

Figure 11:
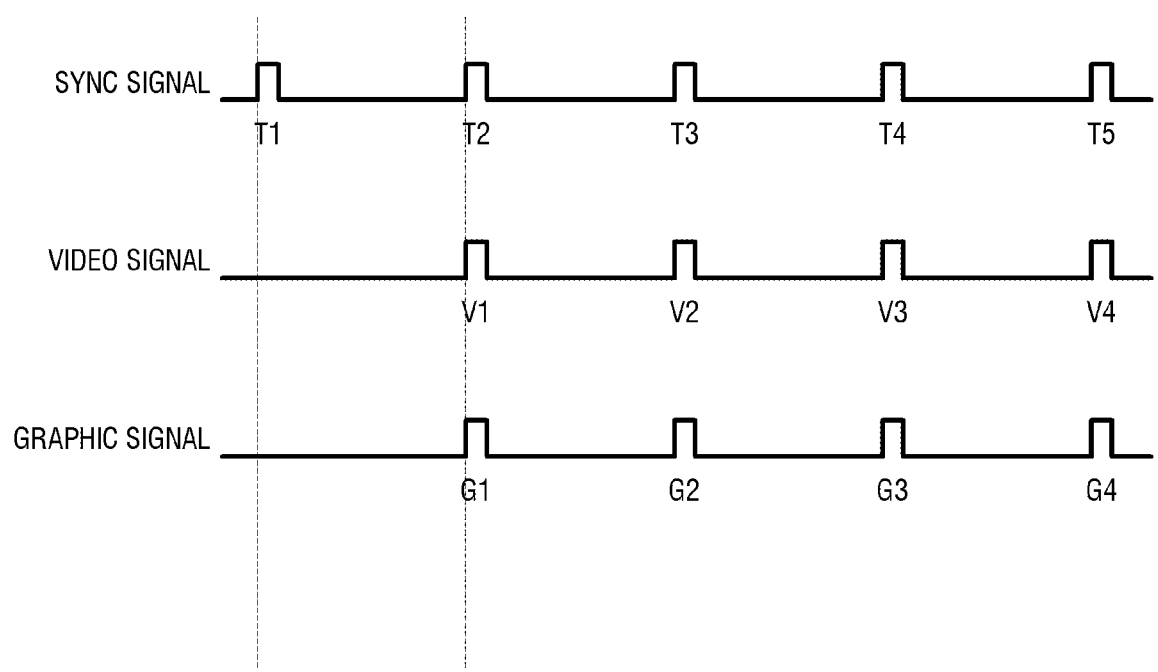
FIG. 11 is a view for explaining an example that a video and a graphic are synchronized and output in the example embodiment of FIG. 8.

FIG. 11 is a view for explaining an example that a video and a graphic are synchronized and output in the embodiment of FIG. 8.

In the embodiment shown in FIG. 11, the video signal and the graphic signal may be synchronized and output for each frame in response to a predetermined sync signal. Here, the sync signal may employ the vertical sync signal Vsync for the display 110 on which an image is displayed.

As shown in FIG. 11, in the electronic apparatus according to an example embodiment, the data or information of the video frame V1 and the graphic frame G1 respectively stored in the first queue 801 and the second queue 802 are popped from the queues 801 and 802 corresponding to one pair of frames at the timing T1 of the sync signal, and then the video frame V1 and the graphic frame G1 are controlled to be synchronized and output by the video scaler 152 and the graphic scaler 162 at the timing T2 of the sync signal.

In the same manner, the data or information of the video frame V2 and the graphic frame G2 are popped up from the queues 801 and 802 corresponding to one pair of frames at the timing T2, and then the video frame V2 and the graphic frame G2 are controlled to be synchronized and output by the video scaler 152 and the graphic scaler 162 at the timing T3 of the sync signal.

Accordingly, in the electronic apparatus 10 according to the embodiment of FIG. 8, the data of the video and graphic frames, of which the identification information, e.g., the numbers (sequence numbers) necessarily correspond to each other, are simultaneously popped as a pair from the queues 801 and 802, and therefore a problem that the video frame and the graphic frame matching each other are output at different points in time does not occur even though one of the video and graphic signals is delayed due to different processing paths as described in the related art of FIG. 6. Thus, it is possible to prevent or reduce the likelihood of the image mismatch and/or distortion due to failure of synchronization between the video and the graphic as shown in FIG. 7.

Figure 12:
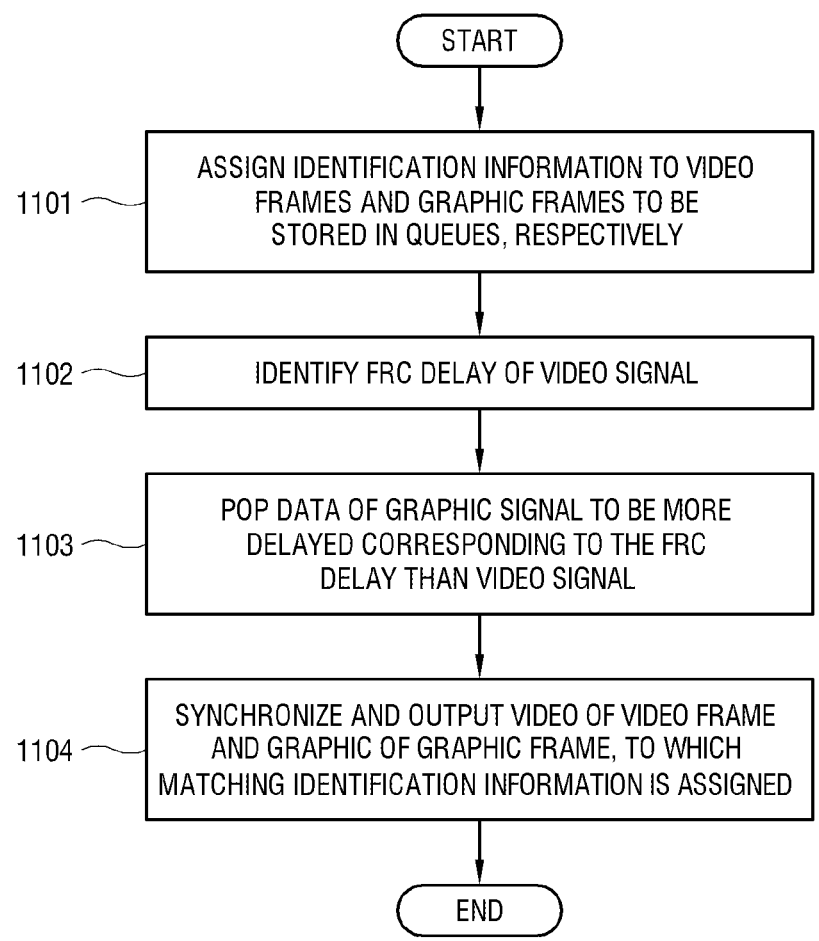
FIG. 12 is a flowchart showing control operations for synchronizing and displaying images in an electronic apparatus according to another example embodiment.
Figure 13:
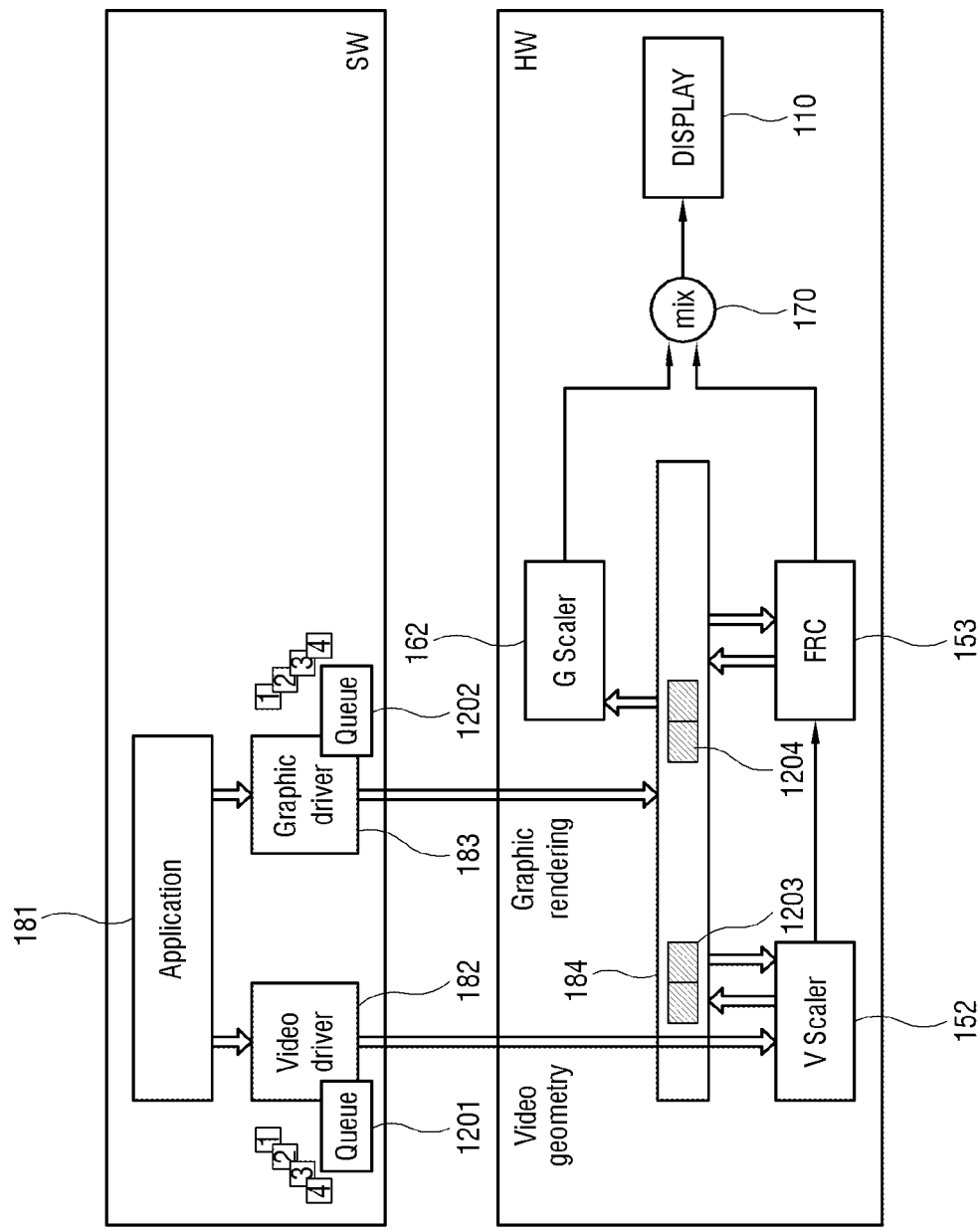
FIG. 13 illustrates operations of configurations for synchronizing and displaying images in the example embodiment of FIG. 12.

FIG. 12 is a flowchart showing control operations for synchronizing and displaying images in an electronic apparatus according to an alternative example embodiment, FIG. 13 illustrates operations of configurations for synchronizing and displaying images in the embodiment of FIG. 12, and FIG. 14 is a view showing an example of delaying and outputting a graphic signal in the embodiment of FIG. 12.

The electronic apparatus according to the embodiment of FIG. 12 identifies a delay time, e.g., an FRC delay that occurs during the frame rate conversion of the first signal, e.g., the video signal, and previously delays the second signal, e.g., the graphic signal as much as the FRC delay, thereby controlling the first signal and the second signal to be synchronized and output.

Like the embodiments of FIGS. 3 and 6, the embodiment of FIG. 12 is characterized in that a pair of frames to be displayed together is identified based on the identification information, e.g., the sequence numbers assigned according to the order of the frames, and the data of the graphic frame assigned with the identification number is popped as being more delayed than the data of the video frame delayed due to the FRC.

Specifically, the main processor 180 of the electronic apparatus 10 may, as shown in FIG. 12, assign or match the numbers, e.g., the sequence numbers as the identification numbers to the frames of the first signal, e.g., the video signal and the frames of the second signal, e.g., the graphic signal, and store the data of the video signal and the data of the graphic signal, which are assigned with the numbers according to the frames, in the queues (1101). Here, the queue is configured to store data by the FIFO method, and thus the data of the video and graphic frames may be sequentially stored in the queues and output.

In the operation 1101, the main processor 180 may assign the identification information for each frame to the video signal and the graphic signal based on the execution, e.g., the start of the synchronization mode, so that the data, e.g., the geometry information of the video frame and the graphic frame to be sequentially stored, e.g., enqueued along with their assigned numbers.

Referring to FIG. 13, the video driver 182 may be executed by the main processor 180 to assign the sequence numbers such as 1, 2, 3, 4, . . . as the identification information to the frames (video frames) of the video signal and store them in a first queue 1201. Likewise, the graphic driver 183 may be executed by the main processor 180 to match the sequence numbers such as 1, 2, 3, 4, . . . as the identification information to the frames (graphic frames) of the graphic signal and store them in a second queue 1202. Therefore, the video frame and the graphic frame, to which the same identification information (e.g., the sequence number) is assigned, are to be displayed together as a pair of matching frames on the display 110.

The graphic driver 183 executed by the main processor 180 may identify an FRC delay that occurs during the frame rate conversion of the first signal, e.g., the video signal (1102). Here, the main processor 180 may obtain information about the FRC delay, which occurs due to the FRC, from the frame rate converter 153.

The graphic driver 183 may control the data of the second signal, e.g., the graphic frame, which is stored in the second queue 1202 while matching the sequence number in the operation 1101, to be popped, e.g., dequeued from the second queue 1202 as being more delayed corresponding to the FRC delay identified in the operation 1102 than the first signal, e.g., the video frame, which is stored in the first queue 1201 while matching the same sequence number in the operation 1101 (1103). In this process, the graphic rendering point in time of the graphic driver 183 may be delayed corresponding to the FRC delay.

For example, when it is identified in the operation 1102 that the FRC delay corresponds to two frames, as shown in FIG. 14, the data of the video frame V1 stored in the first queue 1201 may be controlled to be popped from the first queue 1201 at the timing T1 of the sync signal (1301), but the data of the graphic frame G1 stored in the second queue 1202 and corresponding to the video frame V1 may be controlled to be popped from the second queue 1202 at the timing T3 delayed by two frames (1302).

In the same manner, the data of the video frame V2 is controlled to be popped at the timing T2, while the matching data of the graphic frame G2 is controlled to be popped at the timing T4 as being delayed by two frames.

In other words, in the embodiment of FIG. 12, the data of one of a pair of frames, to which the matching identification information is assigned, may be controlled to be popped, e.g., dequeued as being delayed as much as the FRC delay with respect to the data of the other one delayed due to the FRC.

Therefore, the data of the graphic frame G1 is transmitted to the graphic scaler 162 later by the FRC delay than the point in time when the data of the video frame V1 is transmitted to the video scaler 152.

In addition, the main processor 180 may control the first processor 150 and the second processor 160 to synchronize and output the images of one pair of frames, e.g., the video frame V1 and the graphic frame G1, received in the operation 1102 and assigned with the matching identification information (or sequence number) (1104).

Specifically, in the operation 1103 (e.g., see FIG. 12), the video frame V1 is scaled in the video scaler 152 based on the data, e.g., the video geometry information output at the timing T1, transmitted to the frame rate converter 153 so as to be delayed by two frames during the FRC, and thus output together with the graphic frame G1 to the mixer 170 as being synchronized with the graphic frame G1 output from the graphic scaler 162 based on the data, e.g., the pointer information output at the timing T3. "Based on" as used herein covers based at least on.

In the foregoing embodiment, one of the video and graphic frames to be displayed together, e.g., the graphic frame, is previously delayed corresponding to the RFC delay of the video and then output, and therefore two images, in other words, the first image (video) and the second image (graphic) are synchronized and displayed together on the display 110 without the FRC buffer 903 additionally provided for the graphic frame in the memory 184 as shown in FIG. 10. Referring to FIG. 13, the memory 184 may include a video buffer 1203 to sequentially store the video frames output by the video scaler 152, and a graphic buffer 1204 to sequentially store the graphic frames output by the graphic scaler 162.

According to an embodiment, methods according to various embodiments of the disclosure may be provided as involved in a computer program product. The computer program product may be traded as a product between a seller and a buyer. The computer program product may be distributed in the form of a machine-readable storage medium (for example, a compact disc read only memory (CD-ROM)) or may be directly or online distributed (for example, downloaded or uploaded) between two user apparatuses (for example, smartphones) through an application store (for example, Play Store™). In the case of the online distribution, at least part of the computer program product (e.g., a downloadable app) may be transitorily stored or temporarily produced in a machine-readable storage medium such as a memory of a manufacturer server, an application-store server, or a relay server.

Although a few exemplary embodiments of the disclosure have been described in detail, various changes may be made in these exemplary embodiments without departing from the scope defined in the appended claims.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

The invention claimed is:

1. A display apparatus comprising:
a display;
a video processor configured to process a video signal and comprising a video scaler;
a graphic processor configured to process a graphic signal;
a mixer configured to mix a video corresponding to the video signal processed by the video processor and a graphic corresponding to the graphic signal processed by the graphic processor to be displayed together on the display; and
a main processor configured to:
identify a video frame among a plurality of video frames matching a graphic frame among a plurality of graphic frames, based on identification information assigned to the plurality of video frames of the video signal and identification information assigned to the plurality of graphic frames of the graphic signal,
control the video processor and/or the graphic processor to delay output of at least one of the identified video frame and the identified graphic frame to make the video comprising the identified video frame and the graphic of the identified graphic frame be displayed together on the display,
control the identified video frame and the identified graphic frame to be synchronized and output by the video processor and the graphic processor at a reference point in time set based on a predetermined sync signal,
set geometry information to display the video corresponding to the video signal by executing an application, and
provide the set geometry information to the video scaler, the geometry information including at least one of size information of the video or position information of the video.

2. The display apparatus of claim 1, wherein a frame rate of the video signal is different from a frame rate of the graphic signal.

3. The display apparatus of claim 1, wherein the main processor is configured to assign the identification information to the plurality of video frames in sequence, assign the identification information to the plurality of graphic frames in sequence, and identify the video frame and the graphic frame to which the matching identification information is assigned.

4. The display apparatus of claim 1, wherein the main processor is configured to control data of the video frames to be sequentially stored in a first queue at least by assigning the identification information to the plurality of video frames, control data of the graphic frames to be sequentially stored in a second queue at least by assigning the identification information to the plurality of graphic frames, and control the data of the video frame and the data of the graphic frame, to which the matching identification information is assigned, to be respectively output from the first queue and the second queue at a reference point in time set based on a predetermined sync signal.

5. The display apparatus of claim 4, further comprising a frame rate converter configured to convert a frame rate of the video signal,
wherein the main processor is configured to identify a delay time that occurs during conversion of the frame rate, and control the data of the identified graphic frame between at least the video frame and the graphic frame, to which the matching identification information is assigned, to be output as being more delayed by the identified delay time than the data of the identified video frame.

6. The display apparatus of claim 1, further comprising:
a frame rate converter configured to convert a frame rate of the video signal; and
a memory unit comprising a buffer configured to store the graphic signal processed by the graphic processor based on a delay time that occurs during conversion of the frame rate.

7. The display apparatus of claim 1, wherein
the graphic processor comprises a graphic scaler, and
the main processor is configured to render the graphic corresponding to the graphic signal at least by executing an application, setting a pointer identifying a start point and an end point to output the rendered graphic, and providing information about the set pointer to the graphic scaler.

8. The display apparatus of claim 1, further comprising a memory unit comprising a first buffer configured to store the video signal processed by the video processor, and a second buffer configured to store the graphic signal processed by the graphic processor,
wherein the main processor is configured to control the video of the video frame of the video signal stored in the first buffer, and the graphic of the graphic frame of the graphic signal stored in the second buffer to be synchronized and output.

9. The display apparatus of claim 2, wherein the predetermined sync signal comprises a vertical sync signal for the display.

10. A display apparatus comprising:
a display;
a video processor configured to process a video signal;
a graphic processor configured to process a graphic signal and comprising a graphic scaler;
a mixer configured to mix a video corresponding to the video signal processed by the video processor and a graphic corresponding to the graphic signal processed by the graphic processor to be displayed together on the display; and
a main processor configured to:
identify a video frame among a plurality of video frames matching a graphic frame among a plurality of graphic frames, based on identification information assigned to the plurality of video frames of the video signal and identification information assigned to the plurality of graphic frames of the graphic signal, control the video processor and/or the graphic processor to delay output of at least one of the identified video frame and the identified graphic frame to make the video comprising the identified video frame and the graphic of the identified graphic frame be displayed together on the display, control the identified video frame and the identified graphic frame to be synchronized and output by the video processor and the graphic processor at a reference point in time set based on a predetermined sync signal, and render the graphic corresponding to the graphic signal at least by executing an application, setting a pointer identifying a start point and an end point to output the rendered graphic, and providing information about the set pointer to the graphic scaler.

11. The display apparatus of claim 10, wherein the graphics processor comprises a video scaler, and the main processor is configured to set geometry information to display the video corresponding to the video signal by executing an application, and provide the set geometry information to the video scaler, the geometry information including at least one of size information of the video or position information of the video.

12. The display apparatus of claim 10, wherein a frame rate of the video signal is different from a frame rate of the graphic signal.

13. A method of controlling a display apparatus comprising video processor configured to process a video signal and a graphic processor configured to process a graphic signal, the method comprising:

identifying a video frame among a plurality of video frames matching a graphic frame among a plurality of graphic frames, based on identification information assigned to the plurality of video frames of the video signal and identification information assigned to the plurality of graphic frames of the graphics signal;

controlling the video processor and/or the graphic processor to delay output of at least one of the identified video frame and the identified graphic frame to make a video comprising the identified video frame and a graphic of the identified graphic frame be displayed together on a display;

controlling the identified video frame and the identified graphic frame to be synchronized and output by the video processor and the graphic processor at a reference point in time set based on a predetermined sync signal;

setting geometry information to display the video corresponding to the video signal by executing an application, and providing the set geometry information to a video scaler included in the video processor, the geometry information including at least one of size information of the video or position information of the video.

14. The method of claim 13, wherein a frame rate of the video signal is different from a frame rate of the graphic signal.

15. The method of claim 13, further comprising assigning the identification information to the plurality of video frames in sequence, and assigning the identification information to the plurality of graphic frames in sequence.

16. The method of claim 13, further comprising:

storing data of the video frames sequentially in a first queue at least by assigning the identification information to the plurality of video frames;

storing data of the graphic frames sequentially in a second queue at least by assigning the identification information to the plurality of graphic frames; and controlling the data of the video frame and the data of the graphic frame, to which the matching identification information is assigned, to be respectively output from the first queue and the second queue at a reference point in time set based on a predetermined sync signal.

17. The method of claim 13, further comprising:

identifying a delay time that occurs during frame rate conversion of a video signal; and controlling data of the identified graphic frame between the video frame and the graphic frame, to which the matching identification information is assigned, to be output as being more delayed by the identified delay time than data of the identified video frame.

* * * * *